US011522961B2

(12) United States Patent
Hasegawa et al.

(10) Patent No.: US 11,522,961 B2
(45) Date of Patent: Dec. 6, 2022

(54) COMMUNICATION TERMINAL, COMMUNICATION SYSTEM, COMMUNICATION METHOD, AND NON-TRANSITORY COMPUTER-READABLE MEDIUM

(71) Applicant: Ricoh Company, Ltd., Tokyo (JP)

(72) Inventors: Takashi Hasegawa, Kanagawa (JP); Mayu Hakata, Kanagawa (JP); Takeshi Horiuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 96 days.

(21) Appl. No.: 17/077,225

(22) Filed: Oct. 22, 2020

(65) Prior Publication Data
US 2021/0126978 A1   Apr. 29, 2021

(30) Foreign Application Priority Data

Oct. 23, 2019  (JP) .............................. JP2019-192537
Sep. 29, 2020  (JP) .............................. JP2020-163509

(51) Int. Cl.
*H04L 67/141* (2022.01)
*G06Q 30/02* (2012.01)
(Continued)

(52) U.S. Cl.
CPC .... *H04L 67/141* (2013.01); *G06Q 10/063112* (2013.01); *G06Q 30/016* (2013.01); (Continued)

(58) Field of Classification Search
CPC .............. H04L 67/141; H04L 65/1069; G06Q 10/063112; G06Q 30/016; G06Q 30/0281; G06Q 30/0613; G06Q 50/14
See application file for complete search history.

(56) References Cited

U.S. PATENT DOCUMENTS 10,152,718 B1 * 12/2018 Janefalkar ............. G06F 21/629
2014/0019231 A1 *  1/2014 Sinclair ............. G06Q 30/0246
                                                            705/14.45

(Continued)

FOREIGN PATENT DOCUMENTS

JP      2008-154059      7/2008
JP      2017-175579      9/2017
JP      2017-175580      9/2017

*Primary Examiner* — Joe Chacko
(74) *Attorney, Agent, or Firm* — Xsensus LLP

(57) ABSTRACT

A communication terminal includes circuitry configured to: perform first transmission of connection request information indicating a connection request to a first explainer terminal that preferentially responds to the connection request from the communication terminal provided in an unmanned store; and receive response information indicating a response of connection availability from the first explainer terminal. The circuitry is further configured to perform second transmission of the connection request information to a second explainer terminal that does not preferentially respond to the connection request from the communication terminal provided in the unmanned store, when the circuitry receives the response information indicating that connection is unavailable from the first explainer terminal, or when the circuitry receives from the first explainer terminal no response information indicating whether the connection is available within a certain time period after the first transmission of the connection request information.

16 Claims, 25 Drawing Sheets

(51) Int. Cl.
  *G06Q 30/00*   (2012.01)
  *G06Q 10/06*   (2012.01)
  *G06Q 30/06*   (2012.01)
  *H04L 65/1069* (2022.01)
  *G06Q 50/14*   (2012.01)

(52) U.S. Cl.
  CPC ..... *G06Q 30/0281* (2013.01); *G06Q 30/0613* (2013.01); *H04L 65/1069* (2013.01); *G06Q 50/14* (2013.01)

(56) References Cited

U.S. PATENT DOCUMENTS

2017/0193506 A1*  7/2017  Karnati .............. G06Q 30/0251
2018/0167580 A1   6/2018  Hasegawa
2018/0324228 A1   11/2018 Hasegawa et al.
2018/0367758 A1   12/2018 Shiro et al.
2020/0067992 A1   2/2020  Terayama et al.
2020/0162617 A1   5/2020  Hasegawa \* cited by examiner

FIG. 6A

EXPLAINER MANAGEMENT TABLE

| COMMUNICATION ID | EXPLAINER NAME | OPERATION STATE | SKILL NAME |
|---|---|---|---|
| 01ba | Taro RICOH | ONLINE (READY) | SPECIALTY 1 |
| 01bb | Hanako RICOH | CHAT (BUSY) | SPECIALTY 1, SPECIALTY 2 |
| ... | ... | ... | ... |

FIG. 6B

SKILL GROUP MANAGEMENT TABLE

| SKILL NAME | OPERATING STATE OF SKILL GROUP | COMMUNICATION ID OF EXPLAINER TERMINAL IN STATE OF READY | COMMUNICATION ID OF EXPLAINER TERMINAL IN STATE OF BUSY |
|---|---|---|---|
| SPECIALTY 1 | ONLINE (READY) | 01ba, 01bc | 01bb |
| SPECIALTY 2 | CHAT (BUSY) | | 01bb, 01bd, 01be |
| ... | ... | ... | ... |

FIG. 7A
AUTHENTICATION MANAGEMENT TABLE

| COMMUNICATION ID | PASSWORD |
|---|---|
| 01aa | aaaa |
| 01ab | abab |
| 01ba | baba |
| ... | ... |

FIG. 7B
TERMINAL STATE MANAGEMENT TABLE

| COMMUNICATION ID | DESTINATION NAME | OPERATING STATE | RECEPTION DATE AND TIME | IP ADDRESS OF TERMINAL |
|---|---|---|---|---|
| 01aa | TOKYO MAIN STORE, MACHINE NO. 1 | ONLINE (READY) | 2019.4.10.13:40 | 1.2.1.3 |
| 01ab | TOKYO MAIN STORE, MACHINE NO. 2 | CHAT (BUSY) | 2019.4.09.12:00 | 1.2.1.4 |
| 01ca | OSAKA MAIN STORE, MACHINE NO. 1 | OFFLINE (UNAVAILABLE) | 2019.4.09.12:30 | 1.2.1.5 |
| ... | ... | ... | ... | ... |
| 01ba | METROPOLITAN AREA CENTER, EXPLAINER A | ONLINE (READY) | 2019.4.10.13:45 | 1.2.2.3 |
| 01bb | METROPOLITAN AREA CENTER, EXPLAINER B | OFFLINE (UNAVAILABLE) | 2019.4.10.13:50 | 1.2.2.4 |
| ... | ... | ... | ... | ... |

FIG. 8A
DESTINATION LIST MANAGEMENT TABLE

| COMMUNICATION ID OF SOURCE TERMINAL | COMMUNICATION ID OF DESTINATION TERMINAL |
|---|---|
| 01aa | 01ab,···,01ba,01bb,···,01ca,01cb,01da,01db,··· |
| 01ab | 01aa,01ca,01cb,01da |
| ··· | ··· |
| 01ba | 01aa,01ab,01ca,01cb,01da,01db |
| ··· | ··· |
| 01da | 01aa,01ab,01ba,···,01da,01ca,01cb,···,01db |

FIG. 8B
SESSION MANAGEMENT TABLE

| SESSION ID | APPARATUS ID OF RELAY APPARATUS | COMMUNICATION ID OF SOURCE TERMINAL | COMMUNICATION ID OF DESTINATION TERMINAL | DELAY TIME | DELAY INFORMATION RECEPTION DATE AND TIME |
|---|---|---|---|---|---|
| se01 | 111a | 01aa | 01db | 200 | 2019.4.10.13:41 |
| se02 | 111a | 01ba | 01cb | 50 | 2019.4.10.12:01 |
| ··· | ··· | ··· | ··· | ··· | ··· |

FIG. 8C
COMMUNICATION INFORMATION MANAGEMENT TABLE

| CONTACT ID | RELAY APPARATUS IP ADDRESS | COMMUNICATION ID OF TERMINAL THAT MUTUALLY COMMUNICATES |
|---|---|---|
| co01 | 1.2.1.2 | 01ab, 01da |
| co02 | 1.2.2.1 | 01ba, 01cc |
| ··· | ··· | ··· |

FIG. 9A
SYSTEM UPDATE INFORMATION MANAGEMENT TABLE

| CLIENT ID | CLIENT NAME | LATEST VERSION | UPDATE APPLYING DATE AND TIME | DOWNLOAD URL |
|---|---|---|---|---|
| 001 | STORE TERMINAL APPLICATION | 2.1.0 | 2020/01/01 12:00:00 | https://example.com/tenpo |
| 002 | EXPLAINER TERMINAL APPLICATION | 2.1.0 | 2020/01/01 12:00:00 | https://example.com/operator |

FIG. 9B
COMPANY MANAGEMENT TABLE

| COMPANY ID | COMPANY NAME |
|---|---|
| 0001 | A CORPORATION |
| 0002 | B CORPORATION |
| 0003 | C CORPORATION |

FIG. 9C
GROUP MANAGEMENT TABLE

| GROUP ID (AREA ID) | GROUP NAME (AREA NAME) | CUSTOMER ID |
|---|---|---|
| 001 | EAST JAPAN | 0001 |
| 002 | WEST JAPAN | 0001 |
| 003 | METROPOLITAN AREA | 0002 |

FIG. 10A
TERMINAL MANAGEMENT TABLE

| ACCOUNT ID | DESTINATION NAME | ROLE | LOGIN ID | PASSWORD | COMPANY ID | GROUP ID | COMMUNI-CATION ID |
|---|---|---|---|---|---|---|---|
| 001 | Taro RICOH | EXPLAINER | taroh@example.com | baba | 0001 | 001 | 01ba |
| 002 | Hanako RICOH | EXPLAINER | hanako@example.com | bbbb | 0001 | 001 | 01bb |
| 003 | TOKYO MAIN STORE, MACHINE NO. 1 | STORE | 0001-003 | aaaa | 0001 | 001 | 01aa |
| 004 | Jiro RICOH | ADMINISTRATOR | jiro@example.com | eaea | 0001 | 001 | |
| 005 | OSAKA BRANCH, MACHINE NO. 1 | STORE | 0001-005 | caca | 0001 | 002 | 01ca |
| 006 | Sabro RICOH | EXPLAINER, ADMINISTRATOR | sabu@example.com | bcbc | 0001 | 001 | 01bc |

FIG. 10B
SKILL MANAGEMENT TABLE

| SKILL ID | SKILL NAME | ACCOUNT ID OF EXPLAINER WHO POSSESSES SKILL |
|---|---|---|
| 001 | SPECIALTY 1 (CRUSE) | 001, 002 |
| 002 | SPECIALTY 2 (WEDDING) | 001, 006 |
| 003 | SPECIALTY 3 (...) | 007 |

FIG. 11A
LOGIN INFORMATION MANAGEMENT TABLE

| ID | VERSION | ACCOUNT ID | LAST LOGIN DATE AND TIME |
|---|---|---|---|
| 001 | 2.2.0 | 001 | 2020/1/1 10:00:00 |
| 002 | 2.1.0 | 002 | 2020/1/1 10:12:10 |
| 003 | 2.1.0 | 003 | 2020/1/1 10:10:12 |

FIG. 11B
SUBGROUP MANAGEMENT TABLE

| SUBGROUP ID | SUBGROUP NAME | GROUP ID | ACCOUNT ID OF EXPLAINER WHO BELONGS TO SUBGROUP |
|---|---|---|---|
| 001 | UNMANNED STORE | 001 | 001, 002, 003 |
| 002 | MANNED STORE | 001 | 001, 008 |
| 003 | UNMANNED STORE | 002 | 005, 006, 007 |

FIG. 11C
USER UPDATE INFORMATION MANAGEMENT TABLE

| UPDATE ID | UPDATE TARGET ACCOUNT ID | SCHEDULED UPDATE VERSION | UPDATE APPLYING DATE AND TIME | DOWNLOAD URL |
|---|---|---|---|---|
| 001 | 003, 005 | 2.1.0 | 2020/01/01 12:00:00 | https://example.com/tenpo |
| 002 | 001, 002, 006 | 2.1.0 | 2020/01/01 12:00:00 | https://example.com/operator |

FIG. 14

| ADMINISTRATION CONSOLE | | | | | | LOGOUT |
|---|---|---|---|---|---|---|
| 👤 EXPLAINER | STORE | | | | | |
| 📦 STORE | | | | | | ADD ACCOUNT |
| 🔧 ADMINISTRATOR | NAME | GROUP | LAST LOGIN | UPDATE SCHEDULE | | |
| 👥 GROUP | GUEST 001 | A | 2018/11/27 11:17 | 2020/09/06 9:00 | EDIT | DELETE |
| | ⋮ | ⋮ | ⋮ | ⋮ | EDIT | DELETE |
| | ⋮ | ⋮ | ⋮ | ⋮ | EDIT | DELETE |
| | ⋮ | ⋮ | ⋮ | ⋮ | EDIT | DELETE |
| | ⋮ | ⋮ | ⋮ | ⋮ | EDIT | DELETE |
| | ⋮ | ⋮ | ⋮ | ⋮ | EDIT | DELETE |

FIG. 15

| ADMINISTRATION CONSOLE | EXPLAINER | | | | | | | | ⏻ LOGOUT |
|---|---|---|---|---|---|---|---|---|---|
| 👤 EXPLAINER | | | | | | | | | |
| 🏪 STORE | NAME | EMAIL ADDRESS | SPECIALTY | GROUP | LAST LOGIN | UPDATE SCHEDULE | ADMINIS-TRATOR | RECOR-DING | ADD ACCOUNT |
| 🔧 ADMINISTRATOR | a | res@example.com | CRUSE, HOKKAIDO | A | 2019/09/06 9:00 | 2020/01/01 8:00 | ✓ | MANUAL | EDIT DELETE |
| 👥 GROUP | ⋮ | ⋮ | ⋮ | ⋮ | ⋮ | ⋮ | ⋮ | ⋮ | |
| | ⋮ | ⋮ | ⋮ | ⋮ | ⋮ | ⋮ | ⋮ | ⋮ | |
| | ⋮ | ⋮ | ⋮ | ⋮ | ⋮ | ⋮ | ⋮ | ⋮ | |
| | ⋮ | ⋮ | ⋮ | ⋮ | ⋮ | ⋮ | ⋮ | ⋮ | |
| | ⋮ | ⋮ | ⋮ | ⋮ | ⋮ | ⋮ | ⋮ | ⋮ | |

ADMINISTRATION CONSOLE

👤 EXPLAINER
🏪 STORE
🔧 ADMINISTRATOR
👥 GROUP

EXPLAINER 001

NAME
[                    ]

EMAIL ADDRESS
[                    ]

SPECIALTY
[                    ]

GROUP
[ GROUP 1            ]

SCHEDULED UPDATE DATE AND TIME
[ 2020-01-01 00:00:00 ]

SCHEDULED UPDATE VERSION
[ 1.1.0              ]

RECORDING SETTING
⦿ MANUAL   ○ AUTO

NEW PASSWORD
[ AT LEAST SIX CHARACTERS ]

[UPDATE]

FIG. 18

| ADMINISTRATION CONSOLE | GROUP 1 |
|---|---|
| 👤 EXPLAINER | |
| ≡ STORE | < BACK TO GROUP |
| 🔧 ADMINISTRATOR | NAME |
| 👥 GROUP | [                    ] |
| | [UPDATE] |
| | |
| | SUBGROUP |
| | [ADD SUBGROUP] |

| SUBGROUP NAME | EXPLAINER | | |
|---|---|---|---|
| NO NAME SET | | [EDIT] | [DELETE] |
| FOR UNMANNED STORE | EXPLAINER 001<br>EXPLAINER 002 | [EDIT] | [DELETE] |

FIG. 19

| ADMINISTRATION CONSOLE | STORE 001 |
|---|---|
| ▲ EXPLAINER | < BACK TO STORE |
| ■ STORE | STORE ID<br>vc-dev-001 |
| ✦ ADMINISTRATOR | NAME |
| ▲ GROUP | [ ] |
| | GROUP |
| | [ GROUP 1 ] |
| | SUBGROUP TO BE PREFERENTIALLY CALLED |
| | [ FOR UNMANNED STORE ] |
| | SCHEDULED UPDATE DATE AND TIME |
| | [ 2020-01-01 00:00:00 ] |
| | SCHEDULED UPDATE VERSION |
| | [ 1.1.0 ] |
| | NEW PASSWORD |
| | [ AT LEAST SIX CHARACTERS ] |
| | [UPDATE] |

COMMUNICATION TERMINAL, COMMUNICATION SYSTEM, COMMUNICATION METHOD, AND NON-TRANSITORY COMPUTER-READABLE MEDIUM

CROSS-REFERENCE TO RELATED APPLICATIONS

This patent application is based on and claims priority pursuant to 35 U.S.C. § 119(a) to Japanese Patent Application Nos. 2019-192537, filed on Oct. 23, 2019, and 2020-163509, filed on Sep. 29, 2020, in the Japan Patent Office, the entire disclosure of each of which is incorporated by reference herein.

BACKGROUND

Technical Field

The present disclosure relates to a communication terminal, a communication system, a communication method, and a non-transitory computer-readable medium.

Description of the Related Art

In recent years, a remote concierge service is provided from the viewpoint of streamlining store operations and increasing efficiency. With the remote concierge service, for example, even when a customer in a store has to wait for a support from staffs of the store because the staffs in the store is serving other customers, the customer uses a store terminal to accesses, via the Internet or the like, an explainer terminal of an explainer (concierge) in a remote service center, who has a specialized skills. The customer communicates with the explainer through video call, thereby receiving a customer service.

Further, recently, in addition to manned stores in which staffs who serve customers are present, unmanned stores are operated in which no staff is present. The store terminal is provided also in such unmanned stores, and the customer visits an unmanned store and uses the store terminal to communicate with the explainer in a service center through a video call, thereby receiving a customer service.

Not all explainers of the service center can respond to the customer, because some specialized skills are required for certain customer needs. For example, in a case of a travel agency, an expert who is familiar with domestic travel, an expert who is familiar with overseas travel, or an expert who is familiar with weddings are required to be present at the service center. Therefore, even when the customer sends a call start request using the store terminal in the store to the service center, there may be a case where all the explainers having desired skills do not respond because all the explainers are already responding to other customers remotely. Even in such a situation, since staffs are present in the manned store, any staff speaks to the customer to keep the customer from leaving the store, thereby preventing the loss of the customer. On the other hand, since there is no staff who keeps the customer from leaving the store in the unmanned store, the loss of the customer may occur. To address such issue, at the service center, an explainer terminal is provided that preferentially responds to the call start request from a customer terminal in the unmanned store, to prevent the loss of customers who visit the unmanned store.

SUMMARY

According to one or more embodiments, a communication terminal is communicable with an explainer terminal used by an explainer capable of explaining to a customer in a store via a communication network. The communication terminal includes circuitry configured to: perform first transmission of connection request information indicating a connection request to a first explainer terminal that preferentially responds to the connection request from the communication terminal provided in an unmanned store; and receive response information indicating a response of connection availability from the first explainer terminal. The circuitry is further configured to perform second transmission of the connection request information to a second explainer terminal that does not preferentially respond to the connection request from the communication terminal provided in the unmanned store, when the circuitry receives the response information indicating that connection is unavailable from the first explainer terminal, or when the circuitry receives from the first explainer terminal no response information indicating whether the connection is available within a certain time period after the first transmission of the connection request information.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 6A is a conceptual diagram illustrating an explainer management table, according to an embodiment of the present disclosure;

FIG. 6B is a conceptual diagram illustrating a skill group management table, according to an embodiment of the present disclosure;

FIG. 7A is a conceptual diagram illustrating an authentication management table, according to an embodiment of the present disclosure;

FIG. 7B is a conceptual diagram illustrating a terminal state management table, according to an embodiment of the present disclosure;

FIG. 8A is a conceptual diagram illustrating a destination list management table, according to an embodiment of the present disclosure;

FIG. 8B is a conceptual diagram illustrating a session management table, according to an embodiment of the present disclosure;

FIG. 8C is a conceptual diagram illustrating a communication information management table, according to an embodiment of the present disclosure;

FIG. 9A is a conceptual diagram illustrating a system update information management table, according to an embodiment of the present disclosure;

FIG. 9B is a conceptual diagram illustrating a company management table, according to an embodiment of the present disclosure;

FIG. 9C is a conceptual diagram illustrating a group management table, according to an embodiment of the present disclosure;

FIG. 10A is a conceptual diagram illustrating a terminal management table, according to an embodiment of the present disclosure;

FIG. 10B is a conceptual diagram illustrating a skill management table, according to an embodiment of the present disclosure;

FIG. 11A is a conceptual diagram illustrating a login information management table, according to an embodiment of the present disclosure;

FIG. 11B is a conceptual diagram illustrating a subgroup management table, according to an embodiment of the present disclosure;

FIG. 11C is a conceptual diagram illustrating a user update information management table, according to an embodiment of the present disclosure;

FIG. 14 is a diagram illustrating an example of a store list screen displayed on the administrator terminal, according to an embodiment of the present disclosure;

FIG. 15 is a diagram illustrating an example of an explainer list screen displayed on the administrator terminal, according to an embodiment of the present disclosure;

FIG. 16 is a diagram illustrating an example of a group list screen displayed on the administrator terminal, according to an embodiment of the present disclosure;

FIG. 17 is a diagram illustrating an example of an explainer information edit screen displayed on the administrator terminal, according to an embodiment of the present disclosure;

FIG. 18 is a diagram illustrating an example of a group information edit screen displayed on the administrator terminal, according to an embodiment of the present disclosure;

FIG. 19 is a diagram illustrating an example of a store information edit screen displayed on the administrator terminal, according to an embodiment of the present disclosure;

Figure 1:
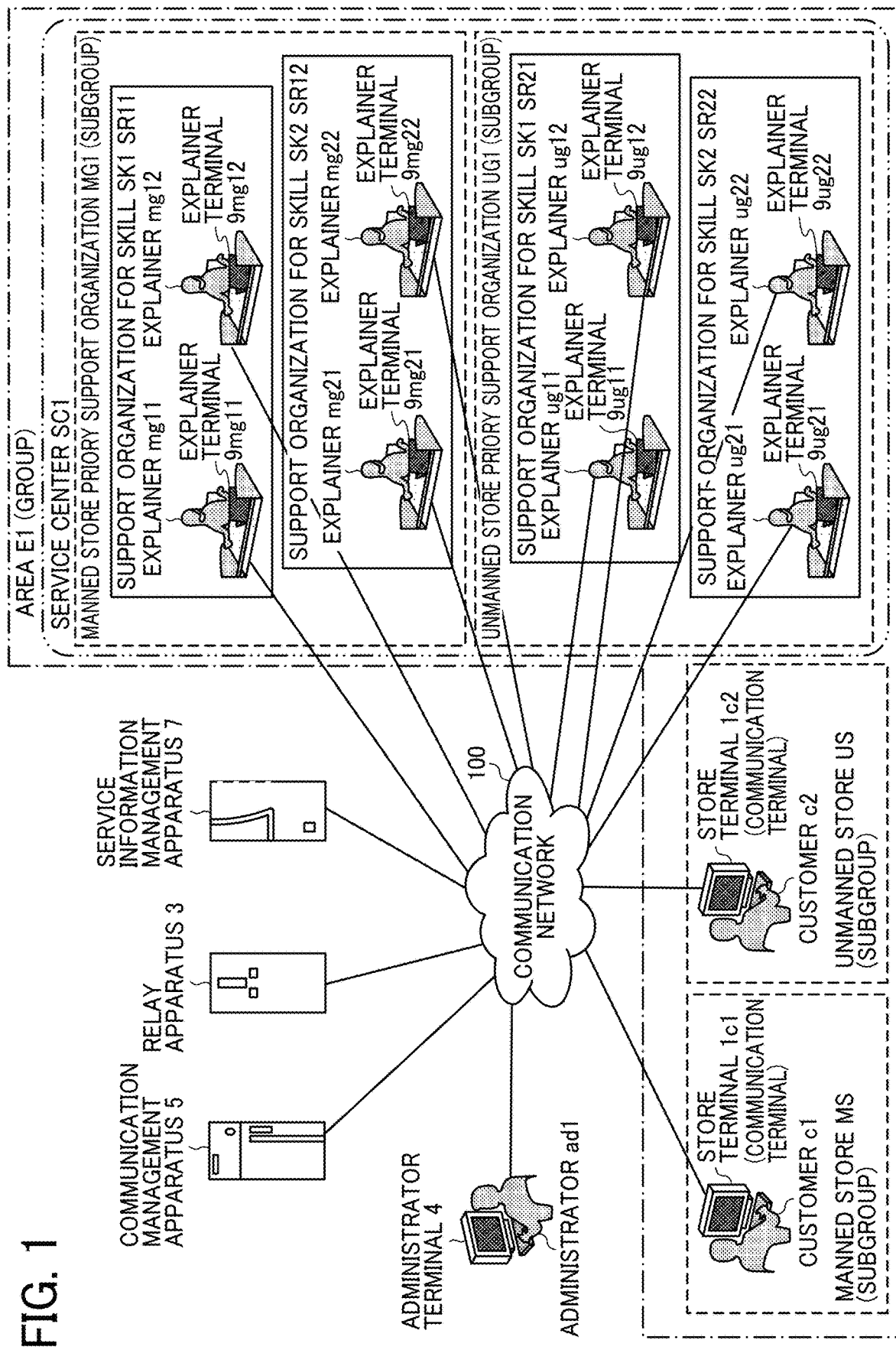
FIG. 1 is a schematic diagram illustrating an example of a configuration of a communication system, according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Overview of Configuration of Communication System:

A description is now given of an overview of a configuration of a communication system with reference to FIG. 1, according to an embodiment. FIG. 1 is a schematic diagram illustrating an overview of the communication system, according to an embodiment of the present disclosure. In the example of FIG. 1, customers, a travel agency that sells travel products to the customers, and a system provider that provides the travel agency with a system for performing remote concierge (remote customer service) are illustrated.

A travel agency operates manned stores, unmanned stores, and service centers in each of a plurality of areas such as Kanto district and Kansai district in Japan. FIG. 1 illustrates that the travel agency operates a manned store MS, an unmanned store US, and a service center SC1 in an area E1. The manned store MS is a store in which staffs who serve the customers are present. The unmanned store is a store in which no staff who serves the customers is present. Although one manned store MS and one unmanned store US are illustrated in FIG. 1, this is just an example. In another example, plural manned stores MS and plural unmanned stores can be provided.

In the manned store MS, staffs usually provide a guide about travel products to customers who visit the store. However, there is a case where no staff can provide a service to a newly visited customer all staffs are serving other customers. In the unmanned store US, there is no staff who serves customers. In such case, the customer uses a store terminal 1c1 in the manned store MS or a store terminal 1c2 in the unmanned store US to access an explainer terminal of an explainer in the service center SC1 via a communication network 100 such as the Internet, thereby receiving remote customer service regarding travel products from the explainer. The explainer is, for example, the remote concierge described above. Since the explainer basically uses his or her dedicated explainer terminal, a particular explainer is associated with a particular explainer terminal.

The store terminal 1c1 and the store terminal 1c2 are each configured by a personal computer (PC). A plurality of store terminals may be provided in the manned store MS and the unmanned store US. In the following description, the plurality of store terminals such as the store terminal 1c1 and the store terminal 1c2 are collectively referred to as a "store terminal 1" or "store terminals 1" to simplify the description.

The service center SC1 includes a manned store priority support organization MG1 and an unmanned store priority support organization UG1. The manned store priority support organization MG1 preferentially receives a call start request for starting remote customer service from the store terminal 1c1 in the manned store MS. The unmanned store priority support organization UG1 preferentially receives a call start request for starting remote customer service from the store terminal 1c2 in the unmanned store US. Note that there may be three or more priority support organizations.

Further, the manned store priority support organization MG1 includes a support organization SR11 for a skill SK1 and a support organization SR12 for a skill SK2. For example, the skill SK1 is an explainer's ability to make a proposal about a cruise, and the skill SK2 is an explainer's ability to make a proposal about a wedding. In substantially the same manner, the unmanned store priority support organization UG1 includes a support organization SR21 for the skill SK1 and a support organization SR22 for the skill SK2. In other words, the manned store priority support organization MG1 and the unmanned store priority support organization UG1 include the support organization SR11 and the support SR21 (or the support organization SR12 and the support organization SR22) in which the explainers having the same skill are present respectively. There may be three or more skills and three or skill support organizations.

Furthermore, in the manned store priority support organization MG1, an explainer mg11 and an explainer mg12 each having the skill SK1 are present in the support organization SR11 for the skill SK1. The explainer mg11 uses an explainer terminal 9mg11, and the explainer mg12 uses an explainer terminal 9mg12.

Further, an explainer mg21 and an explainer mg22 each having the skill SK2 are present in the support organization SR12 for the skill SK2. The explainer mg21 uses an explainer terminal 9mg21, and the explainer mg22 uses an explainer terminal 9mg22.

In substantially the same manner, in the unmanned store priority support organization UG1, an explainer ug11 and an explainer ug12 each having the skill SK1 are present in the support organization SR21 for the skill SK1. The explainer ug11 uses an explainer terminal 9ug11, and the explainer ug12 uses an explainer terminal 9ug12. Further, an explainer ug21 and an explainer ug22 each having the skill SK2 are present in the support organization SR22 for the skill SK2. The explainer ug21 uses an explainer terminal 9ug21, and the explainer ug22 uses an explainer terminal 9ug22.

Note that three or more explainers may present in each support organization (SR11, SR12, SR21, SR22). In this case, an explainer terminal is assigned to each of the three or more explainers. In the following description, the plurality of explainer terminals such as the explainer terminals 9mg11, 9mg12, 9mg21, 9mg22, 9ug12, 9ug12, 9ug21 and 9ug22 are collectively referred to as a "explainer terminal 9" or "explainer terminals 9" to simplify the description.

Further, the travel agency has an administrator ad1 who manages terminals in each service area. The administrator ad1 accesses a service information management apparatus 7 via the communication network 100 by using an administrator terminal 4, to set various service information. This service information is information regarding processing and settings of each terminal of the travel agency. The administrator terminal 4 is configured by a PC.

A customer c1 and a customer c2 are persons who visits the manned store MS and the unmanned store US, respectively.

The system provider manages and operates a relay apparatus 3, a communication management apparatus 5, and the service information management apparatus 7. The relay apparatus 3, the communication management apparatus 5, and the service information management apparatus 7 are computers such as servers. The relay apparatus 3 relays image data and sound data when a video call is performed between any of the store terminals 1 and any of the explainer terminals 9. The communication management apparatus 5 centrally controls login authentication of the store terminals 1 and the explainer terminals 9, management of the communication state of the store terminals 1 and the explainer terminals 9, management of a destination list, and management of the communication state of the relay apparatus 3. The service information management apparatus 7 manages the various service information that are set. A detailed description is given below of the relay apparatus 3, the communication management apparatus 5, and the service information management apparatus 7.

The store terminals 1, the administrator terminal 4, the explainer terminals 9, the relay apparatus 3, the communication management apparatus 5, and the service information management apparatus 7 can be connected to the communication network 100 such as the Internet.

The relay apparatus 3, the communication management apparatus 5, and the service information management apparatus 7 may be implemented by a single computer or may be implemented by a plurality of computers to which one or more units (functions or means) are arbitrarily allocated.

Figure 2:
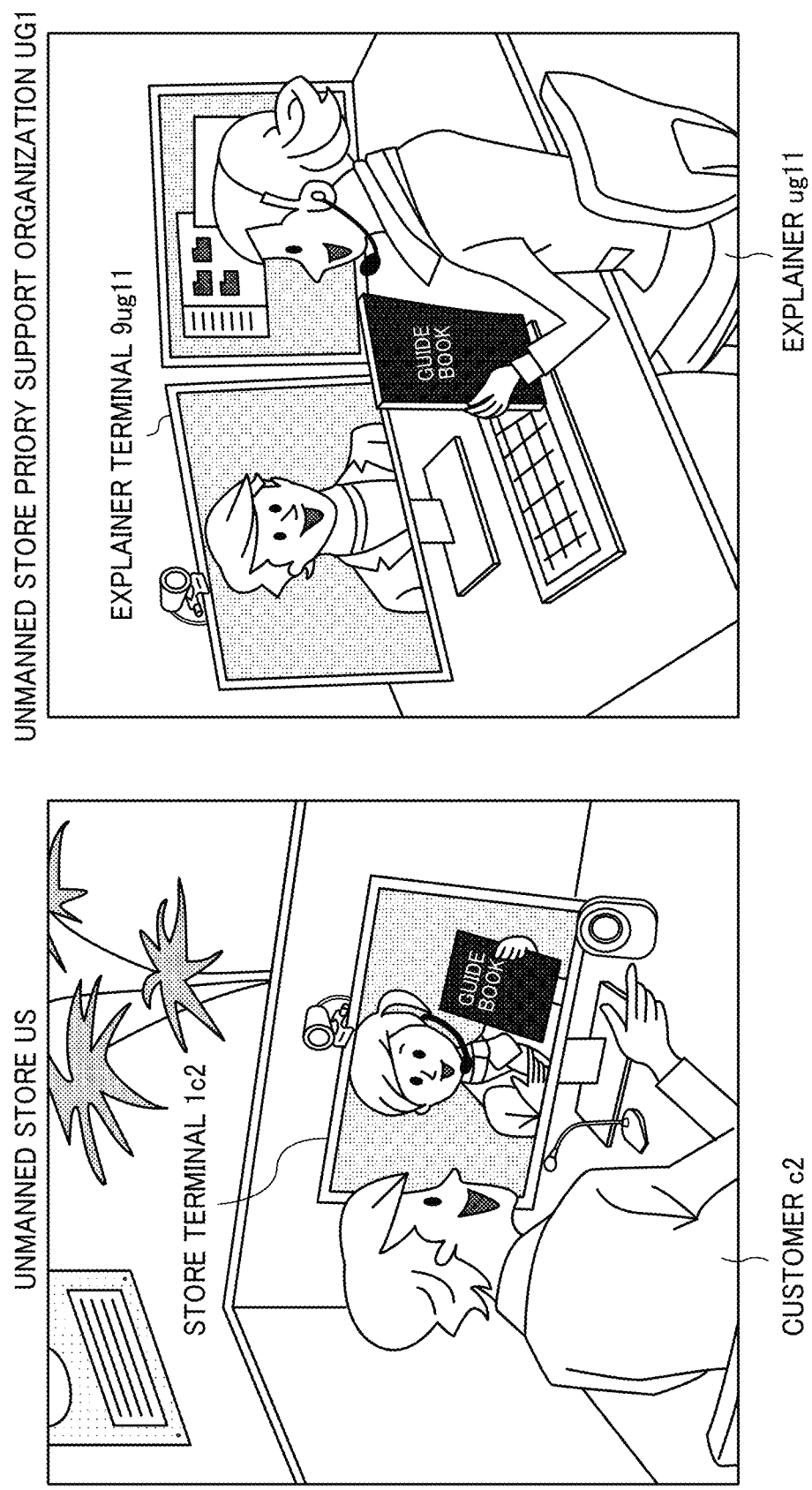
FIG. 2 is an illustration of a situation in which customers in stores and explainers in the service center are remotely performing a video call, according to an embodiment of the present disclosure.

FIG. 2 is an illustration of a situation in which customers in stores and explainers in the service center are remotely performing a video call. FIG. 2 illustrates a state in which the customer c2 who visits the unmanned store US uses the store terminal 1c2 and the explainer ug11 in the unmanned store priority support organization UG1 uses the explainer terminal 9ug11. In this way, the customer c2 can receive the explanation of a travel product by a remote service.

Figure 3:
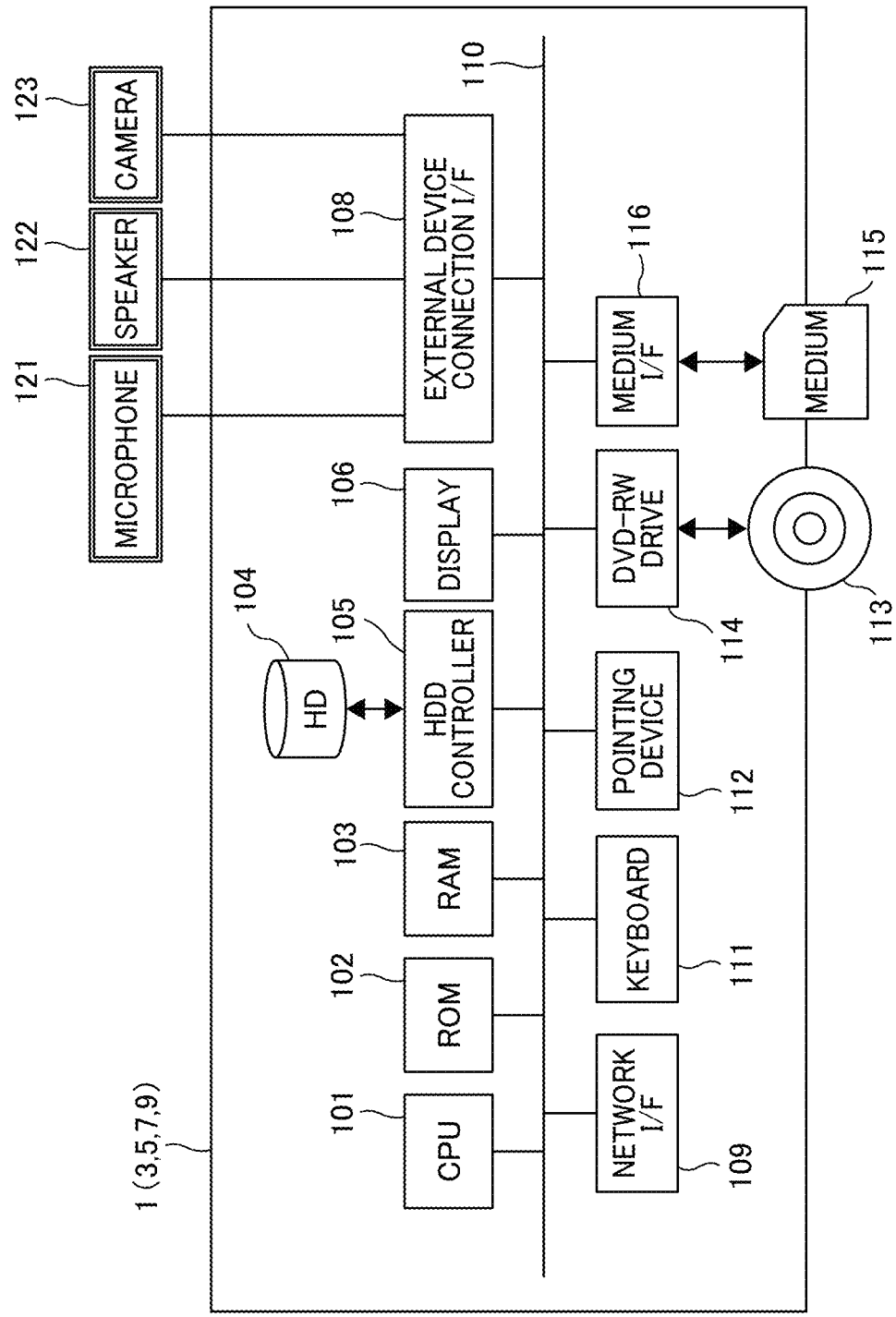
FIG. 3 is a block diagram illustrating an example of a hardware configuration of a store terminal, an administrator terminal, an explainer terminal, a relay apparatus, a communication management apparatus, and a service information management apparatus of the communication system, according to an embodiment of the present disclosure.

Hardware Configuration of Communication System:

Referring to FIG. 3, a description is now given of each terminal (the store terminal 1, the administrator terminal 4, the explainer terminal 9 and each apparatus (the relay apparatus 3, the communication management apparatus 5, the service information management apparatus 7) of the communication system illustrated in FIG. 1. In the present embodiment, assuming that each terminal and apparatus have the same configuration, the hardware configuration of the store terminal 1 is described, and descriptions of the hardware configurations of other terminals and apparatus are omitted to simplify the description.

As illustrated in FIG. 3, the store terminal 1 is implemented by a computer. The store terminal 1 includes a central processing unit (CPU) 101, a read only memory (ROM) 102, a random access memory (RAM) 103, a hard disk (HD) 104, a hard disk drive (HDD) controller 105, a display 106, an external device connection interface (I/F) 108, a network I/F 109, a data bus 110, a keyboard 111, a pointing device 112, a digital versatile disc rewritable (DVD-RW) drive 114 and a medium I/F 116.

The CPU 101 controls entire operation of the computer. The ROM 102 stores a control program such as an initial program loader (IPL) to boot the CPU 101. The RAM 103 is used as a work area for the CPU 101. The HD 104 stores various data such as a control program. The HDD controller 105 controls reading or writing of various data from or to the HD 104 under the control of the CPU 101. The display 106 displays various information such as a cursor, menu, window, characters, or image. The external device connection I/F 108 is an interface circuit that connects the computer to various external devices. Examples of the external devices include, but are not limited to, a universal serial bus (USB) memory and a printer. The network I/F 109 is an interface that controls communication of data between the computer and an external device through the communication network 100. The data bus 110 is, for example, an address bus or a data bus, which electrically connects the elements such as the CPU 101 illustrated in FIG. 3.

The keyboard 111 is an example of an input device provided with a plurality of keys that allows a user to input characters, numerals, or various instructions. The pointing device 112 is an example of an input device that allows a user to select or execute a specific instruction, select a target for processing, or move a cursor being displayed. The DVD-RW drive 114 controls reading or writing of various data from or to a DVD-RW 113, which is an example of a removable storage medium. In alternative to the DVD-RW, any suitable storage medium may be used such as a DVD-R or Blu-ray Disc. The medium I/F 116 controls reading or writing of data from or to a storage medium 115 such as a flash memory.

Further, a microphone 121, a speaker 122, and a camera 123 are connected to the external device connection I/F 108. The microphone 121 is an example of an audio collecting device. The speaker 122 is an example of an audio output device. The camera 123 is an example of an imaging device. Although in FIG. 3, the microphone 121, the speaker 122, and the camera 123 are illustrated as external devices, this is just an example. In another example, the microphone 121, the speaker 122, and the camera 123 are built in the computer without the external device connection I/F 108.

Figure 4:
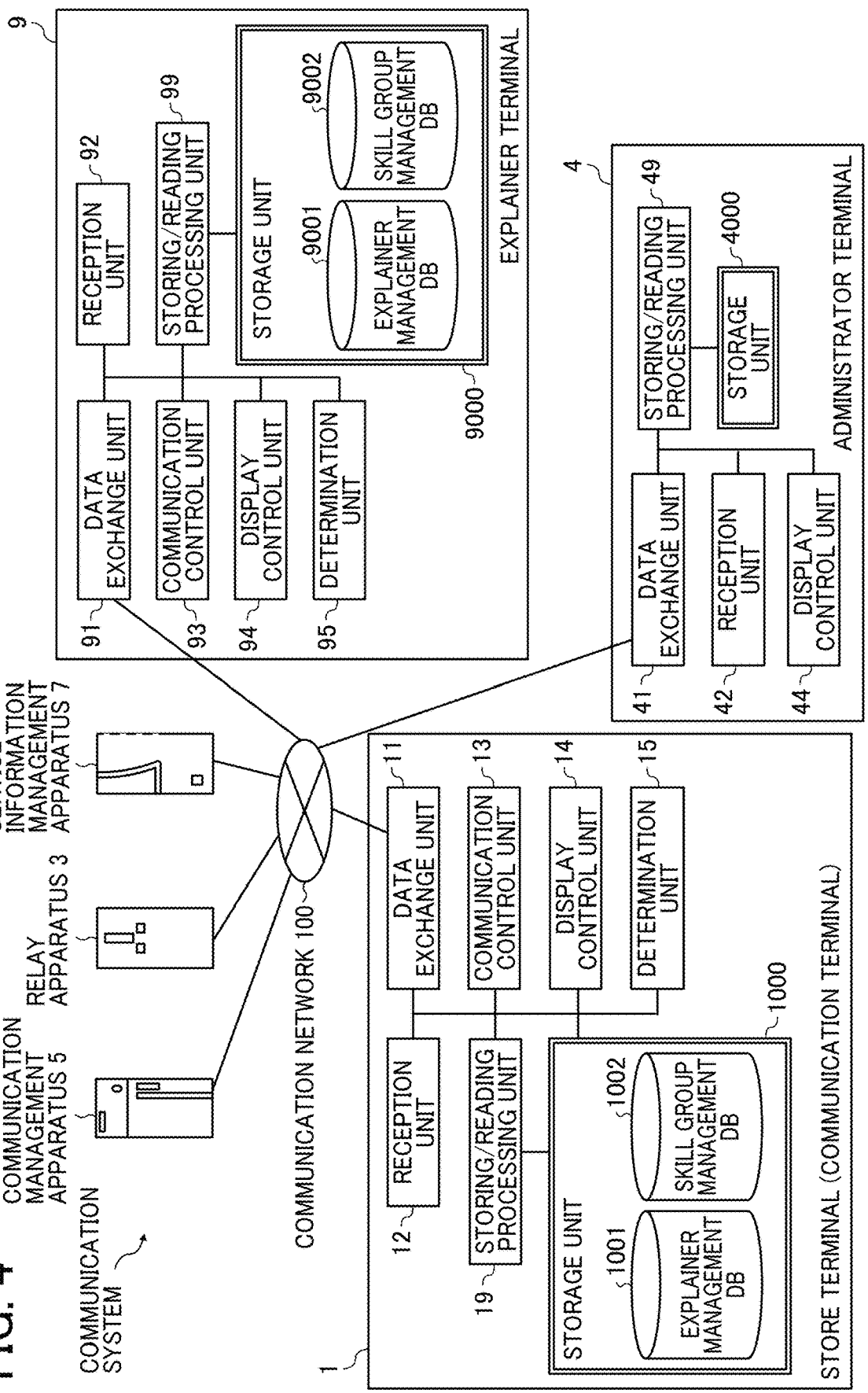
FIG. 4 is a block diagram illustrating an example of a functional configuration of the communication system, according to an embodiment of the present disclosure.
Figure 5:
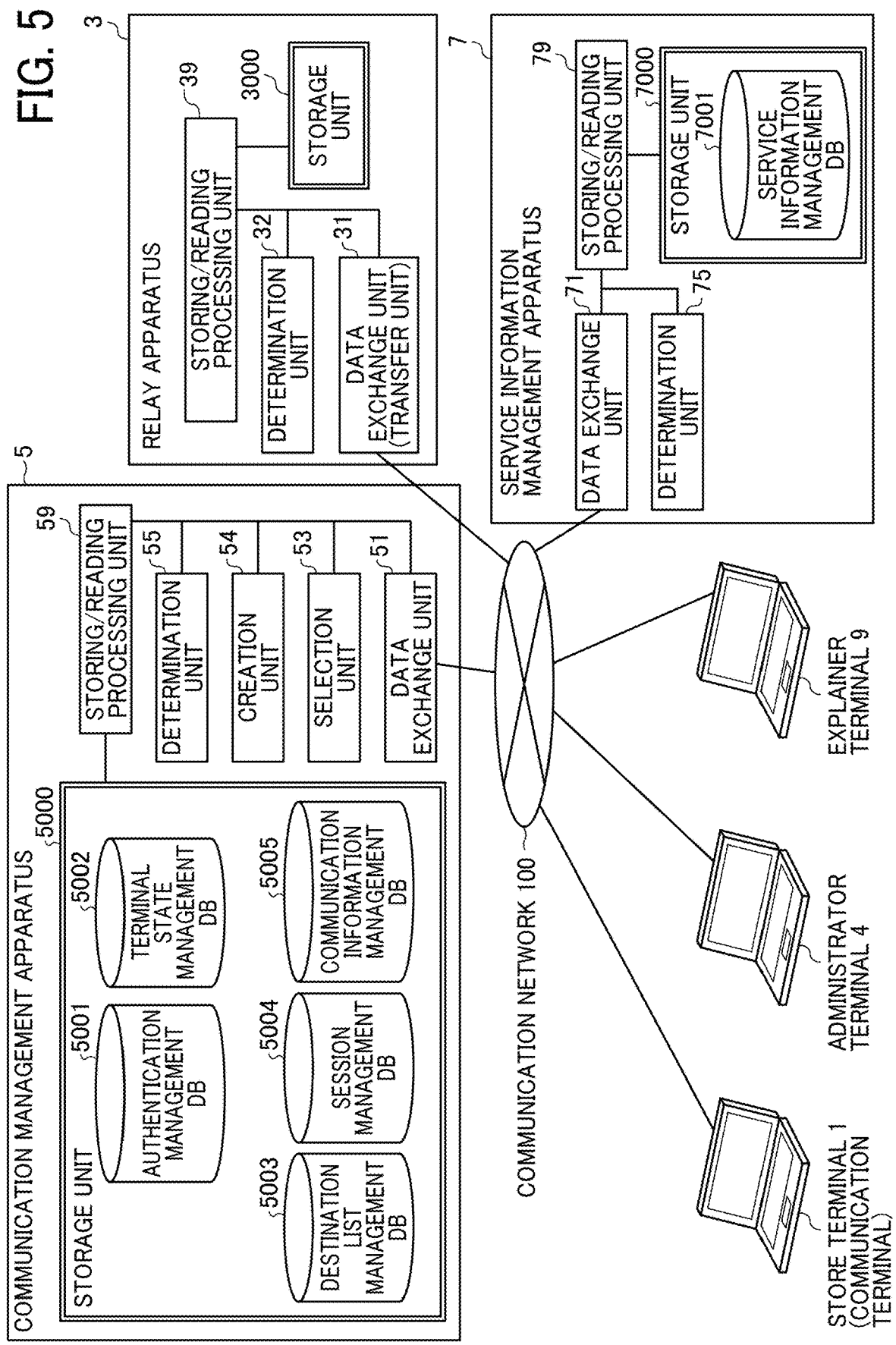
FIG. 5 is a block diagram illustrating an example of a functional configuration of the communication system, according to an embodiment of the present disclosure.

Functional Configuration of Communication System:

A description is now given of a functional configuration of the communication system according to the present embodiment, with reference to FIG. 4 to FIG. 11 (FIG. 11A to FIG. 11C). FIG. 4 and FIG. 5 are block diagrams each illustrating an example of a functional configuration of the communication system according to the present embodiment.

Functional Configuration of Customer Terminal:

First, a functional configuration of the store terminal 1 is described with reference to FIG. 3 and FIG. 4. As illustrated in FIG. 4, the store terminal 1 includes a data exchange unit 11, a reception unit 12, a communication control unit 13, a display control unit 14, a determination unit 15, and a storing/reading processing unit 19. These units are functions that are implemented by or that are caused to function by operating any of the hardware components illustrated in FIG. 3 in cooperation with the instructions of the CPU 101 according to the control program expanded from the HD 104 to the RAM 103. The store terminal 1 further includes a storage unit 1000, which is implemented by the RAM 103 and the HD 104 illustrated in FIG. 3. An explainer management database (DB) 1001 and a skill group management DB 1002 are built in the storage unit 1000. Each information item managed in the explainer management DB 1001 and the skill group management DB 1002 is included in client information transmitted from the service information management apparatus 7 in step S19 described below. Then, the store terminal 1 uses each information item managed in the explainer management DB 1001 and the skill group management DB 1002 to display a screen illustrated in FIG. 23 described below.

Explainer Management Table:

FIG. 6A is a conceptual diagram illustrating an example of an explainer management table. In the storage unit 1000, the explainer management DB 1001 storing the explainer management table as illustrated in FIG. 6A is stored. The explainer management table stores various kinds of information (communication ID, explainer name, operating state (presence) of a destination candidate) of the destination candidate (in this example, the explainer terminal 9) of the store terminal 1 and a skill name indicating a skill of the explainer who individually uses the explainer terminal, in association with each other.

The communication ID, which may be referred to as a contact ID, is identification information identifying a communication destination in the communication system. Examples of the communication ID include, but are not limited to, a user ID identifying an explainer who uses the explainer terminal 9, a communication ID identifying a store terminal. The explainer name in FIG. 6A is the explainer name illustrated in FIG. 23C described below. The operating state indicates an operating state of the terminal as a counterpart of the video call. There are three types of operating state, i.e., online (ready), chat (busy), and offline (unavailable). The operating state is reflected in the displays of FIG. 23A and FIG. 23C. As described above, the skill indicates the name of the skill possessed by the explainer. As illustrated in FIG. 6A, one explainer can have a plurality of skills (specialty 1, specialty 2).

Skill Group Management Table:

FIG. 6B is a conceptual diagram illustrating a skill group management table. In the storage unit 1000, the skill group management DB 1002 storing the skill group management table as illustrated in FIG. 6B is stored. The skill group management table stores the skill name, the operating state (presence) of the skill group, the communication ID of the explainer terminal which is in the state of ready to communicate with the store terminal, and the communication ID of the explainer terminal which is in the state of busy, in association with each other.

The operating state of the skill group indicates an operating state of the explainer terminals as a whole of a group of explainers having the same skill such as the specialty 1. For example, if there are plural explainer terminals of a group of explainers having the same skill, when the operating state of any one of these explainer terminals is "online", the operating state of the skill group of the specialty 1 is managed as "online". Further, even when all the operating states of the plural explainer terminals are not "online", when the operating state of any one of these explainer terminals is "chat", the operating state of the skill group of the specialty 1 is managed as "chat". Further, when all the operating states of the plural explainer terminals are neither "online" nor "chat", in other words, when all the operating states are "offline", the operating state of the skill group of specialty 1 are managed as "offline".

Each Functional Unit of Configuration of Store Terminal:

Next, each functional unit of the store terminal 1 is described according to the embodiment. The data exchange unit 11, which is implemented by instructions of the CPU 101, the external device connection I/F 108, and the network I/F 109, illustrated in FIG. 3, transmits and receives various data (or information) to and from other terminal, apparatus, and system through the communication network 100.

The reception unit 12, which is mainly implemented by instructions of the CPU 101, the keyboard 111, and the pointing device 112, illustrated in FIG. 3, receives various inputs from the user.

The communication control unit 13, which is implemented by instructions of the CPU 101 illustrated in FIG. 3, inputs, from an external camera connected to the external device connection I/F 108, image data obtained by capturing an object by the external camera. Further, the communication control unit 13 inputs audio data obtained by collecting sound from an external microphone connected to the external device connection I/F 108. Furthermore, the communication control unit 13 outputs image data received from the other party of the video call and image data obtained by the store terminal 1 itself to the display control unit 14. Still further, the communication control unit 13 outputs audio data received from the other party of the video call and the audio data obtained by the store terminal itself to an external speaker connected to the external device connection I/F 108.

The display control unit 14, which is mainly implemented by instructions of the CPU 101 illustrated in FIG. 3, outputs image data to the display 106 or an external display connected to the external device connection I/F 108, to control the display 106 or the external display to display an image.

The determination unit 15, which is implemented by instructions of the CPU 101 illustrated in FIG. 3, performs various determinations. A detailed description is given below of determination contents by the determination unit 15.

The storing/reading processing unit 19, which is implemented by instructions of the CPU 101 and by the HDD controller 105 illustrated in FIG. 3, performs processing to store various types of data in the storage unit 1000 or read various types of data stored in the storage unit 1000.

Further, every time image data and audio data are received in performing communication with other terminal, the image data and audio data stored in the storage unit 1000 are overwritten. The display 106 or the external display displays an image based on image data before being overwritten, and the external speaker outputs sound based on audio data before being overwritten.

Administrator Terminal:

A description is now given of a functional configuration of the administrator terminal 4 according to the present embodiment, with reference to FIG. 3 and FIG. 4. As illustrated in FIG. 4, the administrator terminal 4 includes a data exchange unit 41, a reception unit 42, a display control unit 44, and a storing/reading processing unit 49. The administrator terminal 4 further includes a storage unit 4000, which is implemented by the RAM 103 and the HD 104 illustrated in FIG. 3.

The data exchange unit 41, the reception unit 42, the display control unit 44, and the storing/reading processing unit 49 of the administrator terminal 4 have the same or the substantially the same functions as the data exchange unit 11, the reception unit 12, the display control unit 14, and the storing/reading processing unit 19 of the store terminal 1, and therefore the redundant descriptions thereof are omitted below to simplify the description.

Functional Configuration of Explainer Terminal:

A description is now given of a functional configuration of the explainer terminal 9 according to the present embodiment, with reference to FIG. 3 and FIG. 4. As illustrated in FIG. 4, the explainer terminal 9 includes a data exchange unit 91, a reception unit 92, a communication control unit 93, a display control unit 94, a determination unit 95, and a storing/reading processing unit 99. The explainer terminal 9 further includes a storage unit 9000, which is implemented by the RAM 103 and the HD 104 illustrated in FIG. 3. An explainer management DB 9001 and a skill group management DB 9002 are built in the storage unit 9000.

The data exchange unit 91, the reception unit 92, the communication control unit 93, the display control unit 94, the determination unit 95, and the storing/reading processing unit 99 of the explainer terminal 9 have the same or the substantially the same functions as the data exchange unit 11, the reception unit 12, the communication control unit 13, the display control unit 14, the determination unit 15, and the storing/reading processing unit 19 of the store terminal 1, and therefore the redundant descriptions thereof are omitted below to simplify the description. Further, the explainer management DB 9001 and the skill group management DB 9002 of the explainer terminal 9 have the same or substantially the same data structure as the explainer management DB 1001 and the skill group management DB 1002 of the store terminal 1, and therefore redundant descriptions thereof are omitted below to simplify the description.

Functional Configuration of Relay Apparatus:

A description is now given of a functional configuration of the relay apparatus 3 according to the present embodiment, with reference to FIG. 3 and FIG. 5. As illustrated in FIG. 5, the relay apparatus 3 includes a data exchange unit 31 that also functions as a transfer unit, a determination unit 32, and a storing/reading processing unit 39. These units are functions implemented by or caused to function by operating any of the hardware elements illustrated in FIG. 3 in cooperation with instructions of the CPU 101 according to the control program expanded from the HD 104 to the RAM 103. The relay apparatus 3 further includes a storage unit 3000, which is implemented by the RAM 103 and the HD 104 illustrated in FIG. 3.

Each Functional Unit of Configuration of Relay Apparatus:

A description is now given of each of the functional units of the relay apparatus 3 in detail. The data exchange unit 31 of the relay apparatus 3 illustrated in FIG. 5, which is implemented by instructions of the CPU 101 illustrated in FIG. 3 and by the network I/F 109 illustrated in FIG. 3, transmits and receives various types of data (or information) to and from other terminal, apparatus, or system via the communication network 100. The data exchange unit 31 also functions as a transfer unit, which transfers video data and audio data transmitted from a particular terminal to another terminal.

The determination unit 32, which is implemented by instructions of the CPU 101 illustrated in FIG. 3, determines delay of data transmission.

The storing/reading processing unit 39, which is implemented by instructions of the CPU 101 illustrated in FIG. 3 and by the HDD controller 105 illustrated in FIG. 3, performs processing to store various types of data in the storage unit 3000 or read various types of data stored in the storage unit 3000.

Functional Configuration of Communication Management Apparatus:

A description is now given of a functional configuration of the communication management apparatus 5 according to the present embodiment, with reference to FIG. 3 and FIG. 5. As illustrated in FIG. 5, the communication management apparatus 5 includes a data exchange unit 51, a selection unit 53, a creation unit 54, a determination unit 55, and a storing/reading processing unit 59. These units are functions implemented by or caused to function by operating any of the hardware elements illustrated in FIG. 3 in cooperation with instructions of the CPU 101 according to the control program expanded from the HD 104 to the RAM 103. The communication management apparatus 5 further includes a storage unit 5000, which is implemented by the RAM 103 and the HD 104 illustrated in FIG. 3.

Authentication Management Table:

FIG. 7A is a conceptual diagram illustrating an authentication management table. In the storage unit 5000, an authentication management DB 5001 storing an authentication management table as illustrated in FIG. 7A is stored. The authentication management table stores, for each one of the store terminals 1 and the explainer terminals 9 managed by the communication management apparatus 5, the communication ID and the password in association with each other. The password is an example of authentication information. The authentication information also includes an access token.

Terminal State Management Table:

FIG. 7B is a conceptual diagram illustrating a terminal state management table. In the storage unit 5000, a terminal management DB 5002 storing a terminal state management table as illustrated in FIG. 7B is stored. The terminal state management table stores, for each of the communication IDs of the store terminals 1 and the explainer terminals 9, a destination name as each of the store terminals 1 and the explainer terminals 9 being a destination, an operating state of each of the store terminals 1 and the explainer terminals 9, a date and time when login information described below is received at the communication management apparatus 5, and an IP address of each the store terminals 1 and the explainer terminals 9, in association with each other. Note that the communication ID, the destination name, and the IP address of the terminal are stored when each of the store terminals 1 and the explainer terminals 9 is pre-registered to receive service provided by the communication management apparatus 5.

Destination List Management Table:

FIG. 8A is a conceptual diagram illustrating a destination list management table. In the storage unit 5000, a destination list management DB 5003 storing a destination list management table as illustrated in FIG. 8A is stored. The destination list management table stores the communication ID of the terminal (source terminal) that requests to start a call, in association with the communication IDs of all destination terminals registered as candidate destination terminals for the source terminal. The information on such destination terminal candidates is updated by addition or deletion in response to an addition or deletion request transmitted from the administrator terminal 4 to the communication management apparatus 5.

The destination list is an example of destination information. In another example, the destination information can be arrangement of pieces of information relating to the destinations such as the communication ID.

Session Management Table:

FIG. 8B is a conceptual diagram illustrating a session management table. In the storage unit 5000, a session management DB 5004 storing a session management table as illustrated in FIG. 8B is stored. The session management table stores, for each communication session ID identifying a session to perform mutual communication between each terminal and the relay apparatus 3, a relay apparatus ID of the relay apparatus 3 involved in the session, a communication ID of the source terminal, a communication ID of the destination terminal, a delay time (ms) in receiving image data at the destination terminal, and delay information reception date and time indicating when delay information indicating that the delay time is transmitted from the destination terminal and received by the communication management apparatus 5, in association with each other.

Communication Information Management Table:

FIG. 8C is a conceptual diagram illustrating a communication information management table. In the storage unit 5000, a communication information management DB 5005 storing the communication information management table as illustrated in FIG. 8C is stored. The communication information management table stores, for each communication ID identifying mutual communication performed between each terminal and the relay apparatus 3, an IP address of the relay apparatus 3 involved in the mutual communication and the communication IDs of the terminals that perform the mutual communication, in association with each other.

Each Functional Unit of Communication Management Apparatus:

A description is now given of each of the functional units of the communication management apparatus 5 in detail. In the following description of the each functional unit of the communication management apparatus 5, relationships of one or more hardware elements in FIG. 3 with each function unit of the communication management apparatus 5 will also be described.

The data exchange unit 51 of the communication management apparatus 5 illustrated in FIG. 5, which is implemented by instructions of the CPU 101 and by the network I/F 109 illustrated in FIG. 3, transmits and receives various types of data (or information) to and from other terminal, apparatus, or system via the communication network 100.

The selection unit 53, which is implemented by instructions of the CPU 101 illustrated in FIG. 3, selects an optimum relay apparatus for mutual communication based on the IP address of each terminal.

The creation unit 54, which is implemented by instructions of the CPU 101 illustrated in FIG. 3, creates communication information in response to a mutual communication start request from each terminal. This communication information includes, but not limited to, the IP address of the relay apparatus selected by the selection unit 53 and the above-described communication ID.

The determination unit 55, which is implemented by instructions of the CPU 101 illustrated in FIG. 3, performs various determinations.

The storing/reading processing unit 59, which is implemented by instructions of the CPU 101 and by the HDD controller 105 illustrated in FIG. 3, performs processing to store various types of data in the storage unit 5000 or read various types of data stored in the storage unit 5000.

Service Information Management Apparatus:

A description is now given of a functional configuration of the service information management apparatus 7 according to the present embodiment, with reference to FIG. 3 and FIG. 5. As illustrated in FIG. 5, the service information management apparatus 7 includes a data exchange unit 71, a determination unit 75, and a storing/reading processing unit 79. These units are functions implemented by or caused to function by operating any of the hardware elements illustrated in FIG. 3 in cooperation with instructions of the CPU 101 according to the control program expanded from the HD 104 to the RAM 103. The service information management apparatus 7 further includes a storage unit 7000, which is implemented by the RAM 103 and the HD 104 illustrated in FIG. 3. A service information management DB 7001 is built in the storage unit 7000. In the service information management DB 7001, tables illustrated in FIGS. 9A to 9C to FIGS. 11A to 11C are stored.

System Update Information Management Table:

FIG. 9A is a conceptual diagram illustrating a system update information management table. The system update information management table stores, for each client ID, a client name, the latest version, an update applying date and time, and a download URL (Uniform Resource Locator), in association with each other. In a column of the client name, a store terminal application is an application for the store terminal 1, and an explainer terminal application is an application for the explainer terminal 9. Each application is managed by each download URL.

Company Management Table:

FIG. 9B is a conceptual diagram illustrating a company management table. The company management table stores a company ID and a company name in association with each other. Examples of the company include, but are not limited to, a travel agency and a leasing company.

Group Management Table:

FIG. 9C is a conceptual diagram illustrating a group management table. The group management table stores, for each group ID, a group name (area name) and the company ID, in association with each other. The group indicates the area E1 or the like in FIG. 1.

Figure 23A:
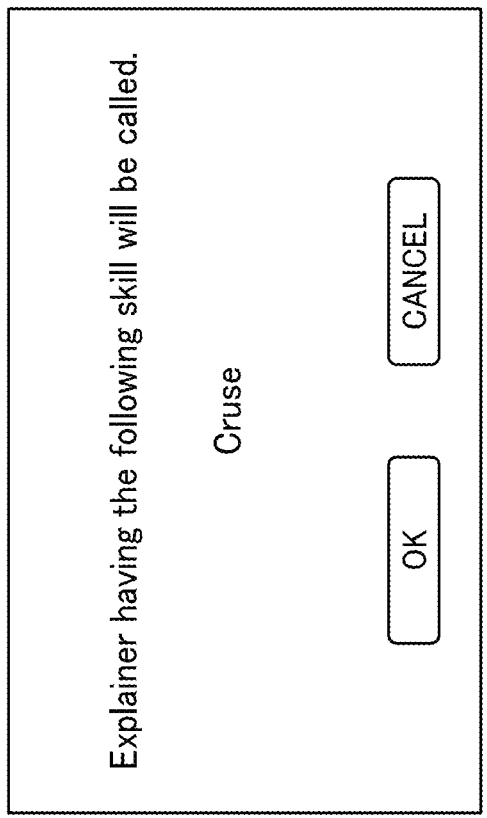
FIGS. 23A to 23D are diagrams each illustrating a screen displayed on the store terminal, according to an embodiment of the present disclosure.
Figure 23B:
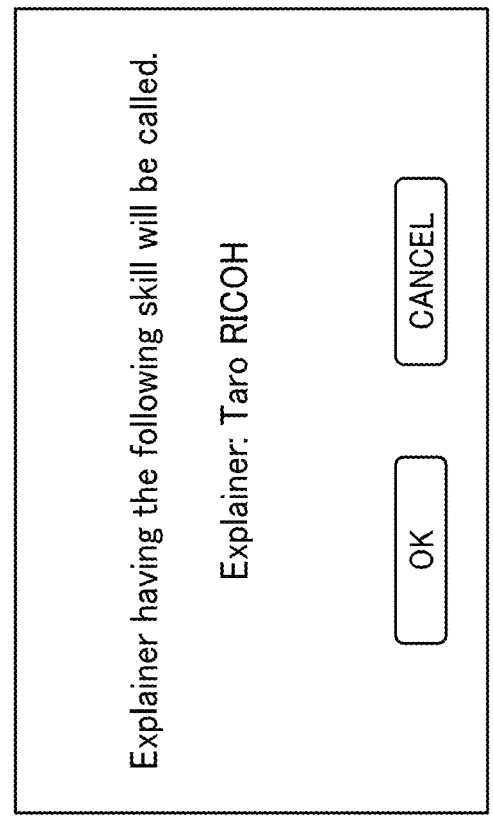
Figure 23C:
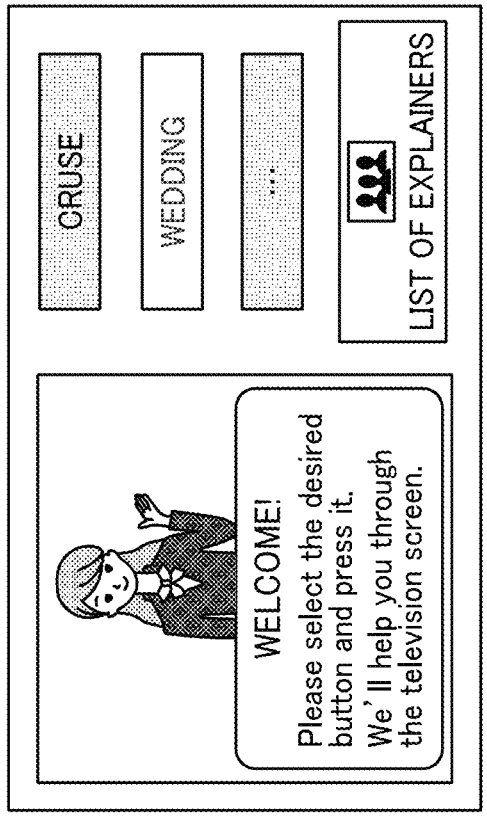

Terminal Management Table:

FIG. 10A is a conceptual diagram illustrating a terminal management table. The terminal management table stores, for each account, the destination name, a role, a login ID, a password, the company ID, a group ID, and the communication ID, in association with each other. The account ID is identification information identifying the store, the explainer, and the administrator. With respect to the store, the account of the store itself is stored, instead of the customer. The destination name is also stored in the terminal state management table illustrated in FIG. 7B. The destination name is a display name displayed on a destination selection screen displayed on the store terminal 1 as illustrated in FIG. 23C. The role indicates a role and the like of a user of the terminal. The login ID and the password are used for authentication when the administrator ad1 accesses the service information management apparatus 7 from the administrator terminal 4. The "password" in this terminal management table is the same as the "password" in the authentication management table in FIG. 7A. However, a different password may be stored. The communication ID is also stored in the terminal state management table (see FIG. 7A) in the communication management apparatus 5.

Skill Management Table:

FIG. 10B is a conceptual diagram illustrating a skill management table. The skill management table stores, for each skill ID, a skill name and the account ID of the explainer who possesses the corresponding skill, in association with each other. As illustrated in FIG. 10B, the skill management table can store information indicating that the same explainer (001) has a plurality of skills such as the specialty 1 and the specialty 2.

Login Information Management Table:

FIG. 11A is a conceptual diagram illustrating a login information management table. The login information management table stores, for each ID of a reference number, a version, the account ID, and a last login date and time, in association with each other. The version is a version of a client application (each application of the store terminal 1 and the explainer terminal 9) at the time of login. This enables to recognize which account uses which version, when the application is updated.

Subgroup Management Table:

FIG. 11B is a conceptual diagram illustrating a subgroup management table. The subgroup management table stores, for each subgroup ID, a subgroup name, the group ID, and the account ID of the explainer who belongs to the subgroup, in association with each other. As illustrated in FIG. 10B, the skill management table can store information indicating that the same explainer (the account ID "001") has a plurality of skills such as the specialty 1 and the specialty 2. With respect to the account ID of the store terminal, the subgroup indicates the manned store or the unmanned store, as illustrated in FIG. 1. Further, with respect to the account ID of the explainer, the subgroup indicates the manned store priority support organization or the unmanned store priority support organization.

According to the subgroup management table, for example, the store terminal whose account ID "003" (Tokyo main store, Machine No. 1) preferentially transmits (first transmission; S84-1, S85-1 of FIG. 24 described below) a connection request information indicating a connection request of a communication session for a video call simultaneously to the explainer terminals used by the explainers whose account IDs "001" and "002", as a previous step of a start request of the video call (see S101 of FIG. 25). When no response is received within a certain time period from the explainer terminal of the explainer whose account IDs are "001" and "002" (see S204 of FIG. 25 described below), the store terminal whose account ID "003" (Tokyo main store, Machine No. 1) transmits (second transmission) the call start request simultaneously to a predetermined explainer terminal whose operating state is "online" (ready) among the explainer terminals of the explainers who have the same skill, other than the explainers whose account IDs are "001" and "002" (see S206 in FIG. 25 described below).

User Update Information Management Table:

FIG. 10C is a conceptual diagram illustrating a user update information management table. The user update information management table stores, for each update ID, an update target account ID, a scheduled update version, the update applying date and time, and the download URL, in association with each other.

Each Functional Unit of Service Information Management Apparatus:

A description is now given of each of the functional units of the service information management apparatus 7 in detail. In the following description of the each functional unit of the service information management apparatus 7, relationships of one or more hardware elements in FIG. 3 with each function unit of the service information management apparatus 7 will also be described.

The data exchange unit 71 of the service information management apparatus 7 illustrated in FIG. 5, which is implemented by instructions of the CPU 101 and by the network I/F 109 illustrated in FIG. 3, transmits and receives various types of data (or information) to and from other terminal, apparatus, or system via the communication network 100.

The determination unit 75, which is implemented by instructions of the CPU 101 illustrated in FIG. 3, performs various determinations.

The storing/reading processing unit 79, which is implemented by instructions of the CPU 101 and by the HDD controller 105 illustrated in FIG. 3, performs processing to store various types of data in the storage unit 7000 or read various types of data stored in the storage unit 7000.

Processes or Operation of Embodiment

A description is now given of processes of operation performed by the communication system according to the present embodiment, with reference to FIG. 12 to FIG. 26. In the following description, the store terminal 1 that sends a request for starting a video call may be referred to as a "source terminal", and the explainer terminal 9 as a request destination (relay destination) to which the request is to be transmitted may be referred to as a "destination terminal".

Processes of Registering Service Information:

First, a description is given of processes of registering various service information from the administrator terminal 4 to the service information management apparatus 7, with reference to FIG. 12 to FIG. 19. The service information is managed in each table described above with reference to FIGS. 9A to 9C to FIGS. 11A to 11C.

Figure 12:
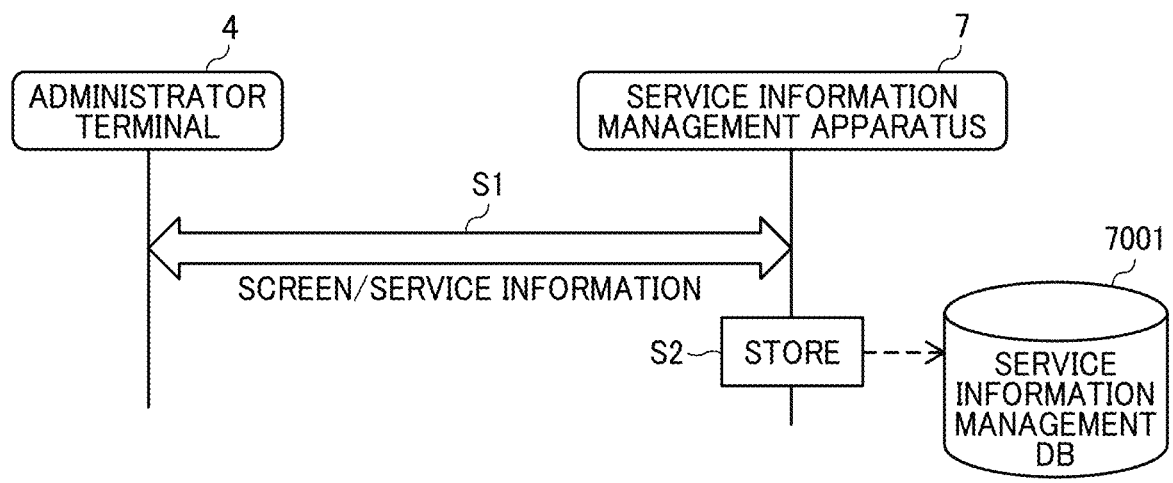
FIG. 12 is a sequence diagram illustrating operation of registering service information, according to an embodiment of the present disclosure.
Figure 13:
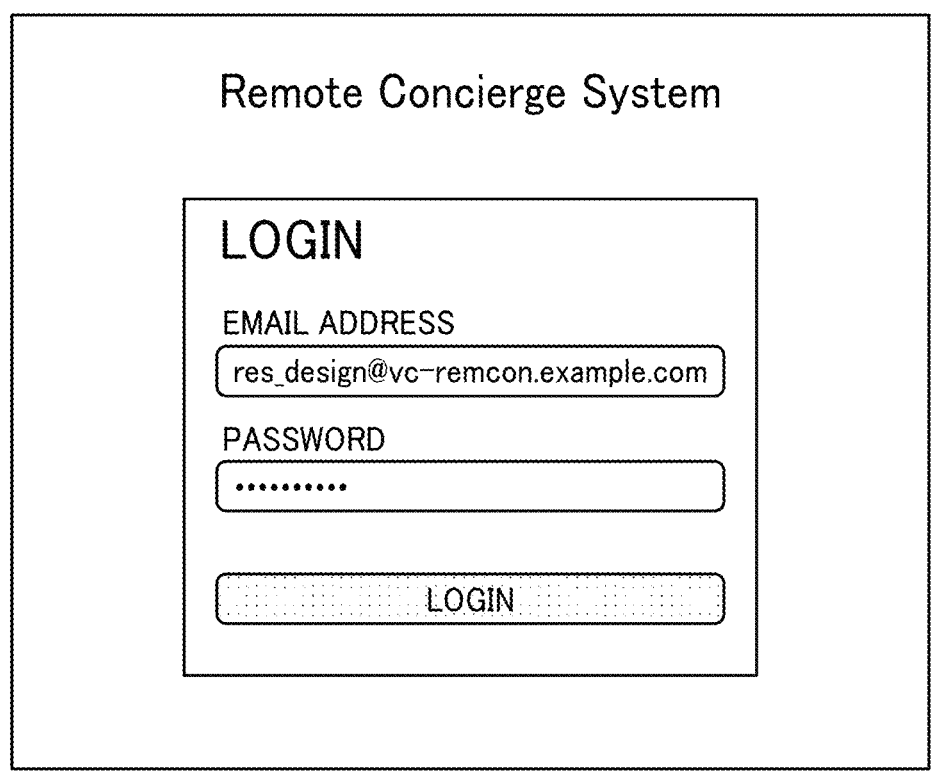
FIG. 13 is a diagram illustrating an example of a login screen displayed on the administrator terminal, according to an embodiment of the present disclosure.
Figure 16:
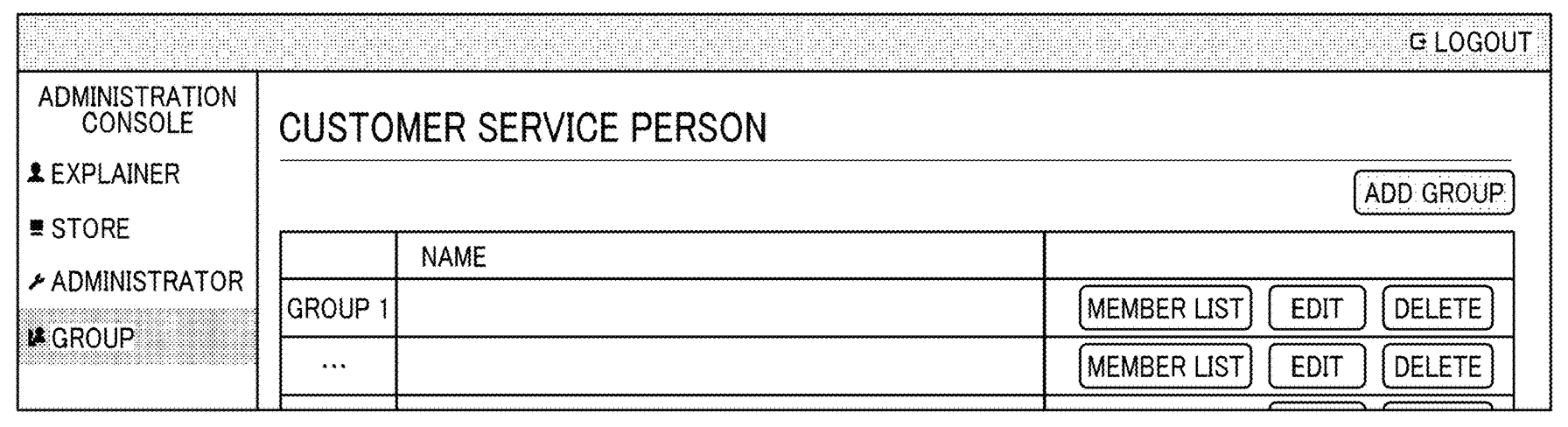

FIG. 12 is a sequence diagram illustrating operation of registering service information. FIG. 13 is a diagram illustrating an example of a login screen displayed on the administrator terminal 4. FIG. 14 is a diagram illustrating an example of a store list screen displayed on the administrator terminal 4. FIG. 15 is a diagram illustrating an example of an explainer list screen displayed on the administrator terminal 4. FIG. 16 is a diagram illustrating an example of a group list screen displayed on the administrator terminal 4. FIG. 17 is a diagram illustrating an example of an explainer information edit screen displayed on the administrator terminal 4. FIG. 18 is a diagram illustrating an example of a group information edit screen displayed on the administrator terminal 4. FIG. 19 is a diagram illustrating an example of a store information edit screen displayed on the administrator terminal 4.

As illustrated in FIG. 12, the administrator ad1 accesses the service information management apparatus 7 using the administrator terminal 4 via the communication network 100. Thereby, a web browser (the display control unit 44) of the administrator terminal 4 controls the display 106 to display the screens of FIG. 13 to FIG. 19, and the data exchange unit 41 transmits each service information entered or selected on each of the screens by the administrator ad1 to the service information management apparatus 7 (51). The data exchange unit 71 of the service information management apparatus 7 receives each service information, and the storing/reading processing unit 79 stores each service information in the service information management DB 7001. Thus, each information is stored in the tables illustrated in FIG. 9 to FIG. 11.

The screens are displayed in the order of FIG. 13 to FIG. 19. For example, on the group information edit screen illustrated in FIG. 18, the administrator ad1 enters the account ID of the explainer of the explainer terminal 9 to which the administrator wants to transmit the call start request preferentially in a "EXPLAINER" field of the subgroup (for the unmanned store). Further, on the store information edit screen illustrated in FIG. 19, the subgroup name (in this example, "FOR UNMANNED STORE") is entered in a "SUBGROUP TO BE PREFERENTIALLY CALLED" field. The store terminal 1 acquires the service information from the service information management apparatus 7 (see S19 of FIG. 20 described below), to manage the explainer terminal 9 to which the store terminal 1 preferentially transmits the call start request (see S20).

Figure 20:
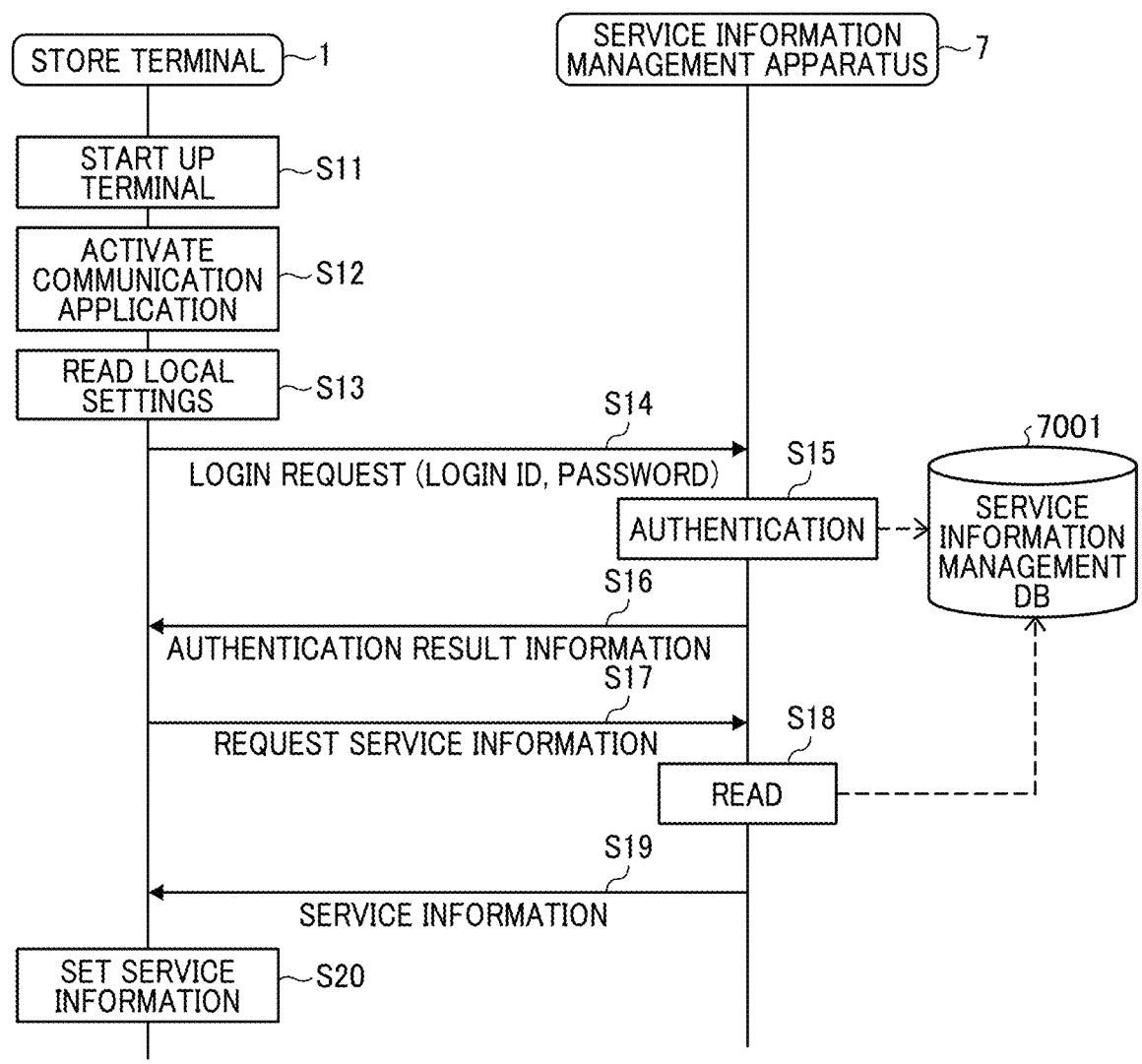
FIG. 20 is a sequence diagram illustrating operation of preparing a video call by the store terminal, specifically operation of acquiring service information, according to an embodiment of the present disclosure.

Processes of Preparing Video Call:

Next, with reference to FIG. 20 to FIG. 23, operation of preparing a video call for a remote customer service is described. FIG. 20 is a sequence diagram illustrating operation of preparing a call of the store terminal 1.

First, when a customer who visits the store turns on a power switch of the store terminal 1, the reception unit 12 receives the turning-on of the power and starts up the store terminal 1 (S11). When the store terminal 1 is started up, a communication application installed in the store terminal 1 is activated (S12). Processes performed by the store terminal 1 in the operation described below are executed by instructions of the communication application. The storing/reading processing unit 19 reads local setting information from the storage unit 1000 (S13). With these processes, the store terminal 1 completes preparation such as a setting of a background image on a display screen, the login ID, and the password.

Next, the data exchange unit 11 of the store terminal 1 transmits a login request to the service information management apparatus 7 via the communication network 100 (S14). This login request includes the login ID and the password read in step S13. The data exchange unit 71 of the service information management apparatus 7 receives the login request. The service information management apparatus 7, which is a receiving side of the login request, acquires the IP address of the store terminal 1, which is a transmitting side of the login request, by receiving the login request transmitted from the store terminal 1 to the service information management apparatus 7.

Next, the determination unit 75 of the service information management apparatus 7 searches the terminal management table (FIG. 10A) stored in the service information management DB 7001 using the login ID and the password included in the login request as search keys, to authenticate the store terminal 1 based on determination as to whether the same login ID and password are stored in the terminal management table (S15).

The data exchange unit 71 of the service information management apparatus 7 transmits authentication result information indicating the authentication result to the store terminal 1 (S16). Thereby, the data exchange unit 11 of the store terminal 1 receives the authentication result information.

Next, the data exchange unit 11 of the store terminal 1 transmits a request for service information to the service information management apparatus 7 (S17). Thereby, the data exchange unit 71 of the service information management apparatus 7 receives the request for service information.

Next, the storing/reading processing unit 79 of the service information management apparatus 7 reads the service information from the service information management DB 7001 (S18). The data exchange unit 71 transmits the service information to the store terminal 1 (S19). Thereby, the data exchange unit 11 of the store terminal 1 receives the service information. Next, the storing/reading processing unit 19 of the store terminal 1 sets the service information (S20).

Processes of Starting Video Call:

First, the creation unit 54 of the store terminal 1 creates a session ID identifying a communication session (S22). Next, the data exchange unit 11 transmits login request information indicating a login request to the communication management apparatus 5 via the communication network 100 (S23). The login request information includes the session ID created in step S22, the communication ID and the password of the store terminal 1 itself in the service information acquired in step S19. This communication ID is a source terminal ID identifying the store terminal 1 that transmits the login request in step S23.

Next, the storing/reading processing unit 59 of the communication management apparatus 5 searches the authentication management table (see FIG. 7A) using the communication ID and password included in the login request information received through the data exchange unit 51 as a search key, to perform terminal authentication by determining whether the same communication ID and the same password are stored in the authentication management table (S24). The following description is provided assuming that the storing/reading processing unit 59 determines that the same communication ID and the same password are stored in the authentication management table.

When the storing/reading processing unit 59 determines that the same communication ID and the same password are stored and therefore the login request is transmitted from a source terminal having a valid usage authorization, the storing/reading processing unit 59 changes a value in the field of the operating state in a record of the communication ID received in step S23 to "Online (ready)" in the terminal state management table (see FIG. 7B), and stores a reception date and time when the login request is received in step S23 in a field of the reception date and time (S25). Thereby, in the terminal state management table, the communication ID "01aa", the operation state "Online (ready)", the reception date and time "2019.4.10.13:40", and the IP address "1.2.1.4" are stored in association with each other. Note that the IP address of the terminal may be transmitted from the store terminal 1 in step S23, instead of being registered in advance.

Next, the storing/reading processing unit 59 adds a new record including the communication ID and password of the store terminal 1 received in step S23 in the session management table (see FIG. 8B) (S26). The data exchange unit 51 of the communication management apparatus 5 transmits authentication result information indicating the authentication result obtained by the process of step S24 to the store terminal 1 that has sent the login request through the communication network 100 (S27).

When the data exchange unit 11 of the login request sender terminal (store terminal 1) receives the authentication result information indicating that the store terminal has a valid usage authorization, the data exchange unit 11 transmits destination list request information indicating a request for a destination list to the communication management apparatus 5 through the communication network 100 (S28). Thereby, the data exchange unit 51 of the communication management apparatus 5 receives the destination list request information.

Next, the storing/reading processing unit 59 searches the destination list management table (see FIG. 8A) using the communication ID "01ab" of the login request sender terminal (store terminal 1) as a search key, to read the communication ID of the destination candidate that can communicate with the login request sender terminal (store terminal 1), and to read the destination name corresponding to the read communication ID from the terminal state management table (see FIG. 7) (S29). As a result, the communication ID and the corresponding destination name of each of the destination candidates associated with the terminal ID "01ab" of the login request sender terminal (store terminal 1) are extracted.

Next, the storing/reading processing unit 59 of the communication management apparatus 5 reads data of a destination list frame from the storage unit 5000 (S30). Then, the data exchange unit 51 transmits destination list information (the destination list frame, the communication ID, the destination name) including the destination list frame, the communication ID and destination name read by the storing/reading processing unit 59 to the login request sender terminal (store terminal 1) (S31). Thereby, the data exchange unit 11 of the login request sender terminal (store terminal 1) receives the destination list information, and the storing/reading processing unit 19 stores the destination list information in the storage unit 1000 (S32).

As described above, in the present embodiment, the communication management apparatus 5 centrally manages the destination list information of all terminals, instead of that each terminal manages the destination list information. Accordingly, for example, when a new terminal is added to the communication system, when a terminal already included in the communication system is replaced with a new model, or when appearance of the destination list frame is to be changed, the communication management apparatus 5 according to the present embodiment centrally manages all destination terminal candidates, resulting in saving time and efforts for changing the destination list information by each terminal.

The storing/reading processing unit 59 of the communication management apparatus 5 searches the terminal state management table (see FIG. 7B) using the extracted communication IDs of the destination candidates as search keys, to obtain the operating states of the communication terminals as the destination candidates (S33).

The data exchange unit 51 transmits terminal state information including the communication IDs that are used as the search keys in step S26 and the operating state of the corresponding destination terminals via the communication network 100 to the source terminal (store terminal 1) (S34).

Next, the storing/reading processing unit 19 of the source terminal (store terminal 1) stores the terminal state information successively received from the communication management apparatus 5 in the storage unit 1000 (S35). The source terminal (store terminal 1) receives the state information of the above-described each terminal, and thereby acquires the current operation states of the destination candidates including the explainer terminal 9, which is currently available to communicate with the store terminal 1.

Next, the display control unit 14 of the login request sender terminal (store terminal 1) generates a destination list that reflects the states of the terminals as destination candidates based on the destination list information and the terminal state information, which are stored in the storage unit 1000 (S36). This destination list is displayed on the store terminal 1, as describe below with reference to FIG. 23C.

The storing/reading processing unit 59 of the communication management apparatus 5 searches the destination list management table (see FIG. 8A) based on the communication ID of the login request sender terminal (store terminal 1), to extract the communication ID(s) of other terminal(s) that is(are) registered in association with the communication ID of the login request sender terminal (store terminal 1) as a destination candidate (S37).

Next, the storing/reading processing unit 59 of the communication management apparatus 5 searches the terminal state management table (see FIG. 7B) based on the communication ID of the login request sender terminal (store terminal 1), to acquire the operating state of the login request sender terminal (store terminal 1) (S38).

The data exchange unit 51 transmits terminal state information including the communication ID and operating state of the login request sender terminal (store terminal 1) acquired in step S37, to the terminal(s) whose operating states is(are) "Online" in the terminal state management table (see FIG. 7B) among the terminals identified by the communication IDs extracted in step S38 (S39). When transmitting the terminal state information to the explainer terminal 9, the data exchange unit 51 refers to the IP addresses of the terminals, which are managed in the terminal state management table (see FIG. 7B), based on each communication ID. Thereby, the communication ID and the operating state of the login request sender terminal (store terminal 1) are transmitted to each of the other destination terminals that can communicate with the login request sender terminal (store terminal 1) as a destination candidate. This enables the destination candidate (such as the explainer terminal 9) to display the destination list with the operating state information as illustrated in FIG. 23C (S40).

Figure 22:
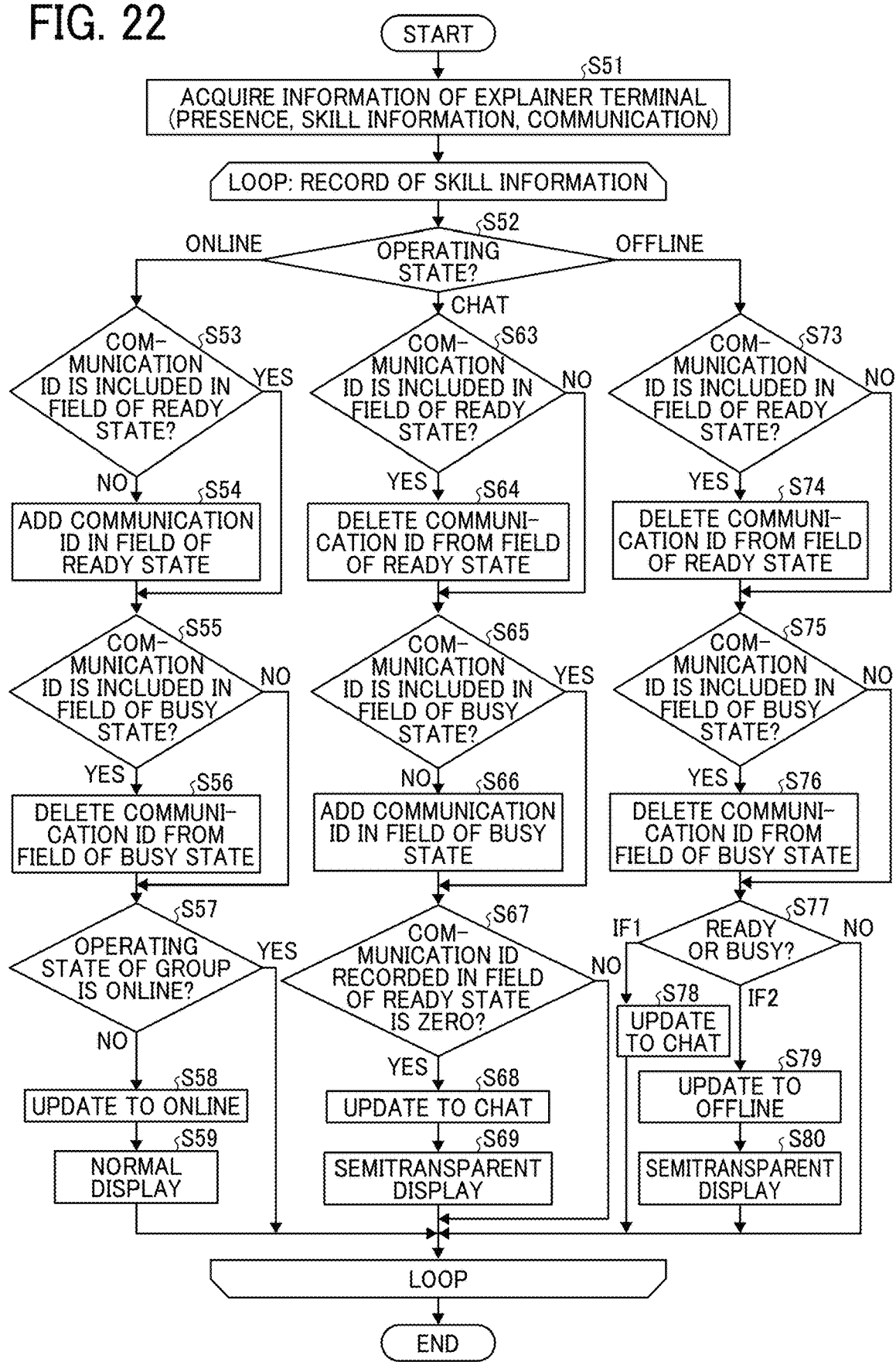
FIG. 22 is a flowchart illustrating operation of preparing a video call by the store terminal, specifically operation of determining an operating state of an explainer terminal group for each skill, according to an embodiment of the present disclosure.

Processes of Determining Operating State of Explainer Terminal Group:

Next, processes performed by the store terminal 1 of determining the operating state of the explainer terminal group for each skill is described with reference to FIG. 22. FIG. 22 is a flowchart illustrating processes of preparing a video call by the store terminal 1, specifically processes of determining an operating state of an explainer terminal group for each skill. When the operating state of a certain skill group is "Online" it indicates that the presence of at least one destination candidate among the destination candidates of the certain skill group is "Online" indicating a state of being available for a call. When the operating state of a certain skill group is "Chat", it indicates that none of the destination candidates of the certain skill group is in a state of "Online", and that at least one destination candidate whose presence is "Chat" indicating a state of being chatting is included. Further, when the operating state of a certain skill group is "Offline", it indicates that any of the destination candidates of the certain skill group are in the operating state "Offline". A description is now given of an example of operation of determining the operating state of the skill group.

Figure 21:
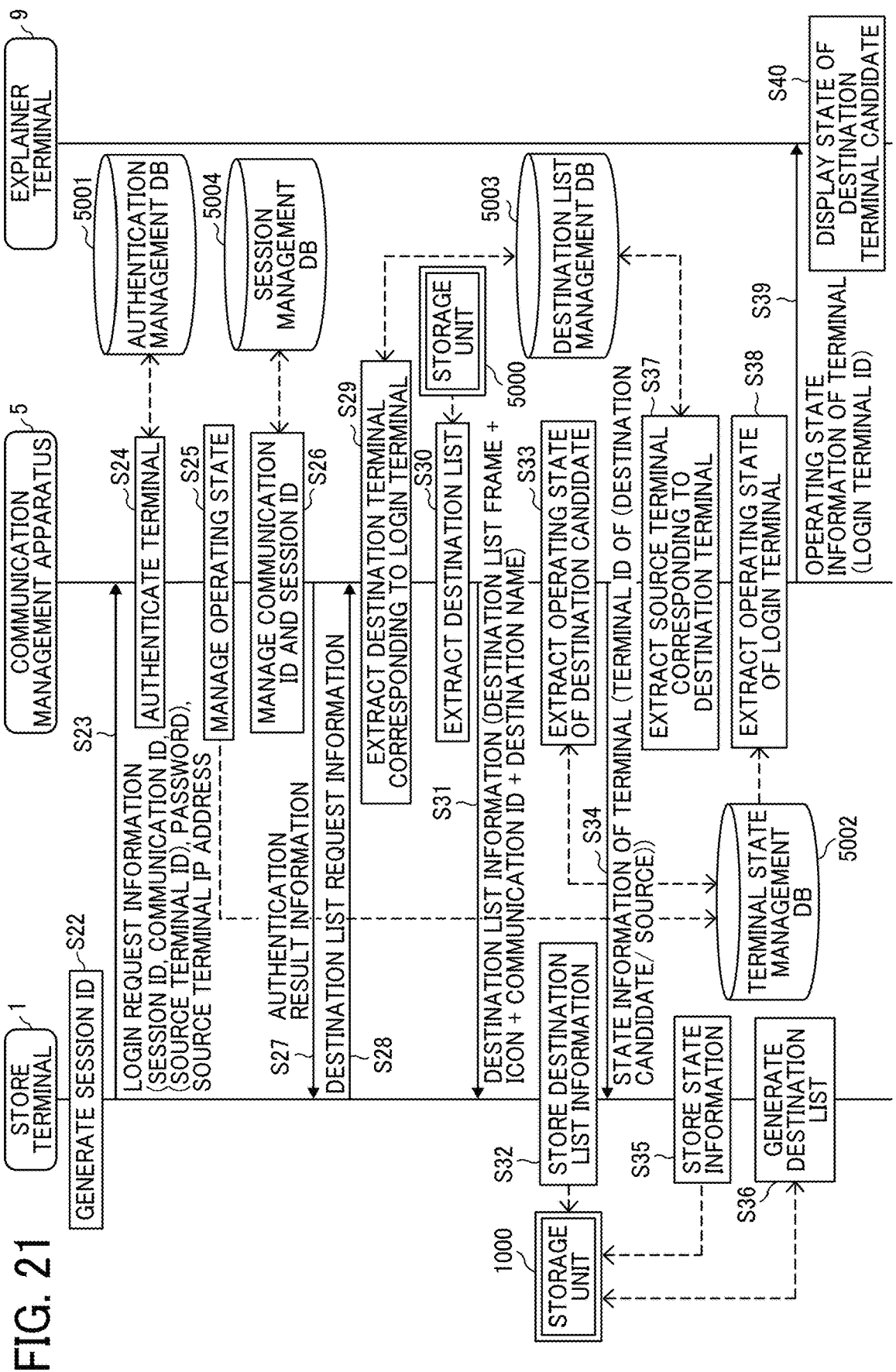
FIG. 21 is a sequence diagram illustrating operation of preparing a video call by the store terminal, specifically operation of acquiring an operating state of each terminal, according to an embodiment of the present disclosure.

Each time when the operating state of the destination management table is updated in step S34 of FIG. 21, the storing/reading processing unit 19 of the store terminal 1 acquires information recorded in the updated record (S51). The acquired information includes the communication ID of the explainer terminal 9ug11, the operating state indicating the latest state of the explainer terminal 9ug11 as the destination candidate, and the skill name indicating the skill of the explainer who uses the explainer terminal 9ug11 as the destination candidate.

The storing/reading processing unit 19 of the store terminal 1 updates each record in the skill group management DB 1002 that includes the skill name acquired in step S51. For example, when the acquired skill name is "specialty 1, specialty 2", the storing/reading processing unit 19 updates each record including the skill name "specialty 1, specialty 2" in the skill group management DB 1002.

In the following, a description is given of, as an example, an operation performed when the operating state information (operating state "Online", skill name (specialty 1, specialty 2), communication ID "01ba") is transmitted from the explainer terminal 9ug11 to the store terminal 1, and the store terminal 1 acquires these information items in step S51 (S52: Online).

First, a description is given of a process of updating a record including the skill name "specialty 1" in the table stored in the skill group management DB 1002 by loop processing. The storing/reading processing unit 19 of the store terminal 1 refers to the field of the communication ID in the state of ready in the record including the skill name "specialty 1" in the skill group management DB 1002 (see FIG. 6B). Thereby, the determination unit 15 determines whether the communication ID "01ba" acquired in step S51 is included in the field of the communication ID in the state of ready (S53).

When the determination unit 15 determines that the communication ID "01ba" acquired in step S51 is not included in the field of the communication ID in the state of ready in the skill group management DB 1002 (S53: NO), the storing/reading processing unit 19 adds the acquired communication ID "01ba" to the field of the communication ID in the state of ready (S54).

After S54 or in a case in which the determination result in S53 is YES, the storing/reading processing unit 19 of the store terminal 1 refers to the field of the communication ID in the state of busy in the record including the skill name "specialty 1" in the skill group management DB 1002 (see FIG. 6B). Thereby, the determination unit 15 determines whether the communication ID "01ba" acquired in step S51 is included in the field of the communication ID in the state of busy (S55).

When the determination unit 15 determines that the communication ID "01ba" acquired in step S51 is included in the field of the communication ID in the state of busy in the skill group management DB 1002 (S55: YES), the storing/reading processing unit 19 deletes the acquired communication ID in the field of the communication ID in the state of busy (S56). Through the processes described so far, when the operating state of the explainer terminal 9ug11 transitions from "Chat" to "Online" or from "Offline" to "Online", the communication ID of the explainer terminal 9ug11 is recorded only in the field of the communication ID in the state of ready in the record including the skill name "specialty 1" in the skill group management DB 1002.

After S56 or in a case in which the determination result in S55 is NO, the storing/reading processing unit 19 of the store terminal 1 refers to the operating state of the group in the record including the skill name "specialty 1" in the skill group management DB 1002 (see FIG. 6B). Thereby, the determination unit 15 determines whether the operating state of the group is "Online" (S57).

When the determination unit 15 determines that the operating state of the group in the record including the skill name "specialty 1" is recorded is not "Online" (S57: NO), the storing/reading processing unit 19 updates the operating state to "Online" (S58). Thus, when displaying the screen as illustrated in FIG. 23A, the display control unit 14 performs normal display so that "CRUSE", for example, is viewed clearly. By contrast, when the determination unit 15 determines that the operating state of the group in the record including the skill name "specialty 1" is "Online" (S57; YES), the storing/reading processing unit 19 does not update the operating state of the group in the recorded including the skill name "specialty 1". Through the processes described so far, the operating state of the group in the record including the skill name "specialty 1" in the skill group management DB 1002 becomes "Online".

Since the skill name "specialty 1, specialty 2" is acquired in step S51, the storing/reading processing unit 19 performs the loop processing for each record including the skill name "specialty 2" in the skill group management DB 1002 to update the record, in substantially the same manner as described above.

In the following, a description is given of, as an example, an operation performed when the operating state information (operating state "Chat", skill name (specialty 1, specialty 2), communication ID "01ba") is transmitted from the explainer terminal 9ug11 to the store terminal 1, and the store terminal 1 acquires these information items in step S51 (S52: Chat).

First, a description is given of a process of updating a record including the skill name "specialty 1" in the skill group management DB 1002 by loop processing. The storing/reading processing unit 19 of the store terminal 1 refers to the field of the communication ID in the state of ready in the record including the skill name "specialty 1" in the table stored in the skill group management DB 1002. Thereby, the determination unit 15 determines whether the communication ID "01ba" acquired in step S51 is included in the field of the communication ID in the state of ready (S63). When the determination unit 15 determines that the communication ID "01ba" acquired in step S51 is included in the field of the communication ID in the state of ready in the skill group management DB 1002 (S63: YES), the storing/reading processing unit 19 deletes the acquired communication ID "01ba" from the field of the communication ID in the state of ready (S64).

After S64 or in a case in which the determination result in S63 is NO, the storing/reading processing unit 19 of the store terminal 1 refers to the field of the communication ID in the state of busy in the record including the skill name "specialty 1" in the skill group management DB 1002. Thereby, the determination unit 15 determines whether the communication ID "01ba" acquired in step S51 is included in the field of the communication ID in the state of busy (S65). When the determination unit 15 determines that the communication ID "01ba" acquired in step S51 is not included in the field of the communication ID in the state of busy in the skill group management DB 1002 (S65: NO), the storing/reading processing unit 19 adds the acquired communication ID "01ba" to the field of the communication ID in the state of busy (S66). Through the processes described so far, the communication ID of the explainer terminal 9ug11 is recorded only in the field of the communication ID in the state of busy in the record including the skill name "specialty 1" in the skill group management DB 1002.

After S66 or in a case in which the determination result in S65 is YES, the storing/reading processing unit 19 of the store terminal 1 refers to the field of the communication ID in the state of ready in the record including the skill name "specialty 1" in the skill group management DB 1002. Thereby, the storing/reading processing unit 19 determines whether the number of communication IDs recorded in the field of the communication ID in the state of ready in the record including the skill name "specialty 1" is recorded is zero (S67).

When the number of communication IDs recorded in field of the communication ID in the state of ready in the record including the skill name "specialty 1" is zero (S67: YES), the storing/reading processing unit 19 updates the operating state of the group in the record including the skill name "specialty 1" to "Chat" (step S68). Thus, when displaying the screen as illustrated in FIG. 23A, the display control unit 14 performs semitransparent display such as "WEDDING". By contrast, when the number of communication IDs recorded in the field of communication ID in the state of ready in the record including the skill name "specialty 1" is not zero (S67: NO), the storing/reading processing unit 19 does not update the operating state of the group in the record including the skill name "specialty 1". In other words, when the communication ID is recorded in the field of communication ID in the state of ready in the record including the skill name "specialty 1", a corresponding operating state remains as "Online" without being updated.

Since the skill name "specialty 1, specialty 2" is acquired in step S51, the storing/reading processing unit 19 performs the loop processing for each record including the skill name "specialty 2" in the skill group management DB 1002 to update the record, in substantially the same manner as described above.

In the following, a description is given of, as an example, an operation performed when the operating state information (operating state "Offline", skill name (specialty 3, specialty 4), communication ID "01ca") is transmitted from the explainer terminal 9ug21 to the store terminal 1, and the store terminal 1 acquires these information items in step S51 (S52: Offline).

First, a description is given of a process of updating a record including the skill name "specialty 3" in the skill group management DB 1002 by loop processing. The storing/reading processing unit 19 of the store terminal 1 refers to the field of the communication ID in the state of ready in the record including the skill name "specialty 3" in the table stored in the skill group management DB 1002. Thereby, the determination unit 15 determines whether the communication ID "01ca" acquired in step S51 is included in the field of the communication ID in the state of ready (S73).

When the determination unit 15 determines that the communication ID "01ca" acquired in step S51 is included in the field of the communication ID in the state of ready in the skill group management DB 1002 (S63: YES), the storing/reading processing unit 19 deletes the acquired communication ID "01ca" from the field of the communication ID in the state of ready (S74).

After S74 or in a case in which the determination result in S73 is NO, the storing/reading processing unit 19 of the store terminal 1 refers to the field of the communication ID in the state of busy in the record including the skill name "specialty 3" in the table stored in the skill group management DB 1002. Thereby, the determination unit 15 determines whether the communication ID "01ca" acquired in step S51 is included in the field of the communication ID in the state of busy (S75).

When the determination unit 15 determines that the communication ID "01ca" acquired in step S51 is included in the field of the communication ID in the state of busy in the skill group management DB 1002 (S75: YES), the storing/reading processing unit 19 deletes the acquired communication ID "01ca" from the field of the communication ID in the state of busy (S76). Through the processes described so far, the communication ID of the explainer terminal 9ug21 is deleted from the record including the skill name "specialty 3" in the skill group management DB 1002.

After S76 or in a case in which the determination result in S75 is NO, the storing/reading processing unit 19 of the store terminal 1 refers to the fields of the communication ID in the state of ready and in the state of busy in the records including the skill name "specialty 3" in the skill group management DB 1002. Thus, the storing/reading processing unit 19 determines whether a condition IF1 or a condition IF2 is satisfied (step S77). The condition IF1 is satisfied when the number of communication IDs listed in the field of the communication ID in the state of ready in the record including the skill name "specialty 1" is zero and the number of communication IDs listed in the field of the communication ID in the state of busy is not zero. The condition IF2 is satisfied when the number of communication IDs included in the field of communication ID in the state of ready in the record including the skill name "specialty 3" is zero and the number of communication IDs included in the field of communication ID in the state of busy is zero.

When the number of the communication IDs recorded in the field of communication ID in the state of ready in the record including the skill name "specialty 3" is zero and the number of the communication IDs recorded in the field of communication ID in the state of busy in the same record is not zero (S77: IF1), the storing/reading processing unit 19 updates the operating state of the group in the record including the skill name "specialty 3" to "chat" in skill group management DB 1002 (step S78). When the number of the communication IDs included in the field of the communication ID in the state of ready in the record including the skill name "specialty 3" is zero and the number of the communication IDs included in the field of communication ID in the state of busy in the same record is zero (S77: IF2), the storing/reading processing unit 19 updates the operating state of the group in the record including the skill name "specialty 3" to "offline" in the skill group management DB 1002 (S79). Thus, when displaying the screen as illustrated in FIG. 23A, the display control unit 14 performs semitransparent display such as "WEDDING". By contrast, when the determination of S77 is not either IF1 or IF2 (S77: NO), the storing/reading processing unit 19 does not update the operating state of the group in the record including the skill name "specialty 3", i.e., keeps the operating state as being "online".

Since the skill name "specialty 3, specialty 4" is acquired in step S51, the storing/reading processing unit 19 performs the loop processing for each record including the skill name "specialty 4" in the skill group management DB 1002 to update the record, in substantially the same manner as described above.

Figure 23D:
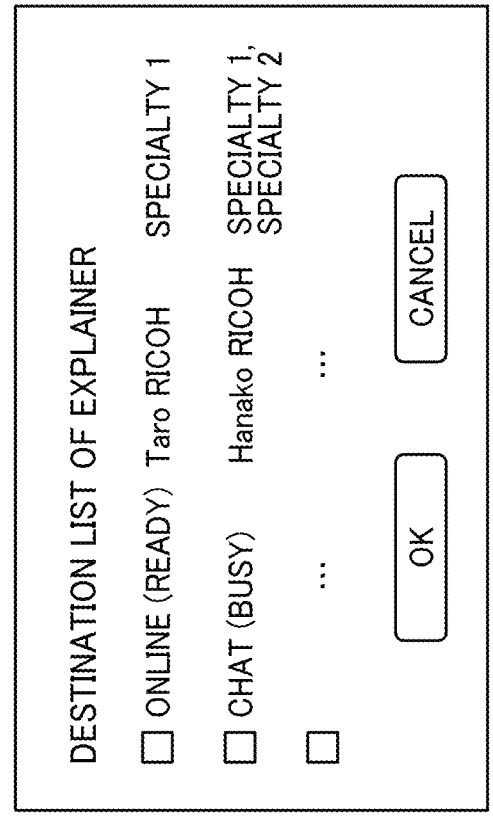
Figure 24:
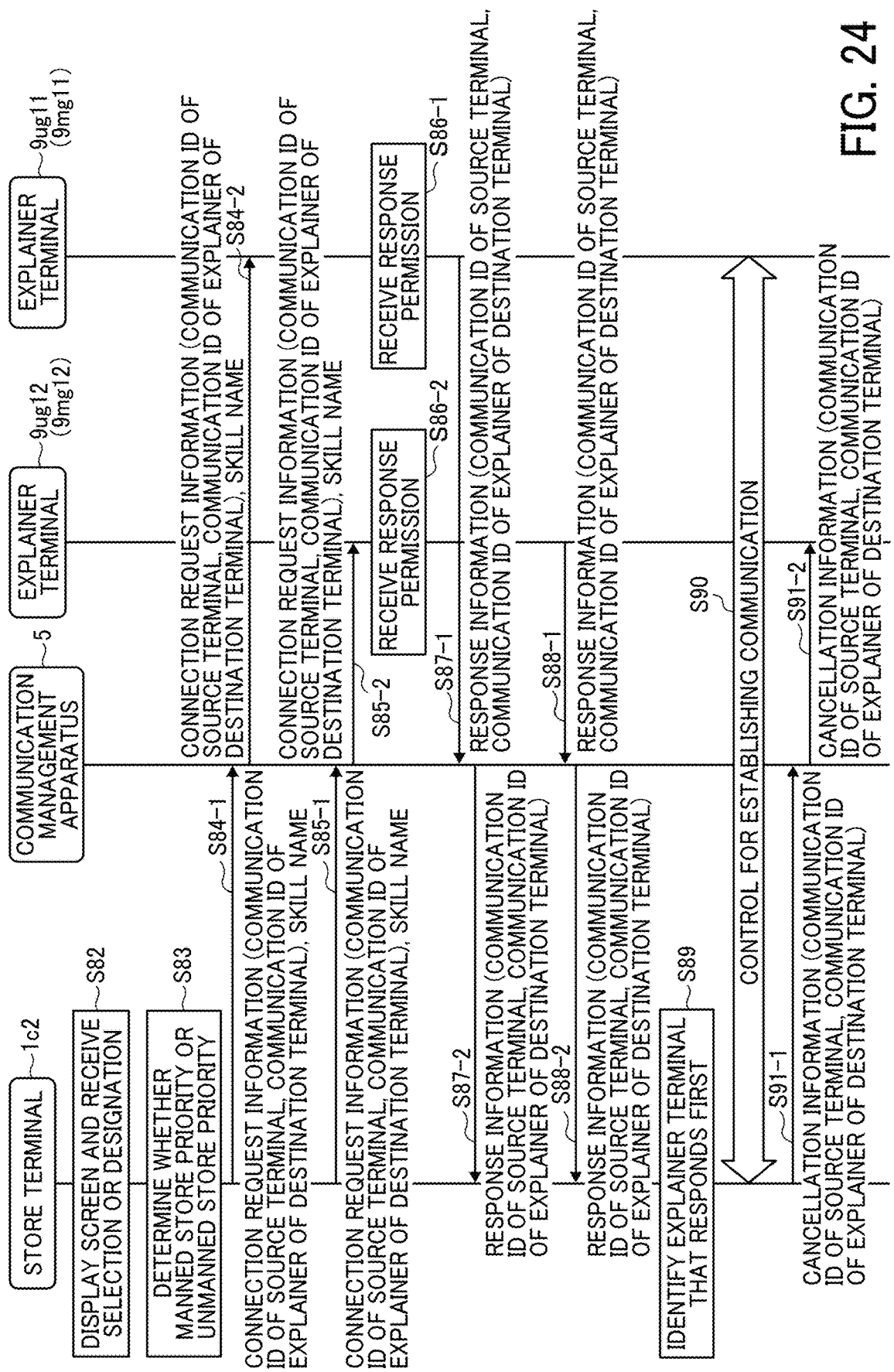
FIG. 24 is a sequence diagram illustrating operation of starting a video call, according to an embodiment of the present disclosure.

Processes of Starting Video Call:

Next, with reference to FIGS. 23A to 23D and FIG. 24, operation of starting a video call for a remote customer service is described. FIGS. 23A to 23D are diagrams each illustrating a screen displayed on the store terminal 1. FIG. 24 is a sequence diagram illustrating operation of starting a video call.

The display control unit 14 of the store terminal 1 controls the display 106 of the store terminal 1 to display any one of the screens of FIGS. 23A to 23D, and the reception unit 12 receives selection of a desired skill group or designation of a desired explainer from a customer (S82).

Specifically, the storing/reading processing unit 19 acquires sets of the skill name and the operating state of the skill group associated with the skill name stored in the table of the skill group management DB 1002 (see FIG. 6B). Thereby, the display control unit 14 controls the display 106 of the store terminal 1 to display a skill selection screen as illustrated in FIG. 23A.

In the right half area of the skill selection screen, skill display buttons (cruise, wedding, etc.) that allows the customer to select a desired skill, and an explainer list display button that, when selected, displays a destination list of all the explainer are displayed. In the example of FIG. 23A, the skill display button of "cruise" is normally displayed, to allow the customer to select this button. By contrast, the skill display button of "wedding" is semi-transparently displayed, whereby not allowing the customer to select this button. For example, when the customer selects the skill display button of "cruise", the reception unit 12 receives the selection, and thereby the display control unit 14 controls the display 106 to display a confirmation screen as illustrated in FIG. 23B. When the customer selects an "OK" button, the reception unit 12 receives the selection, and thereby the data exchange unit 11 transmits connection request information indicating a connection request of a communication session for a video call to a desired explainer terminal 9 via a communication management apparatus 5 (see S84-1 and S85-1 described below).

On the other hand, when the customer selects the explainer list display button on the skill selection screen illustrated in FIG. 23A, the reception unit 12 receives the selection, and thereby the display control unit 14 controls the display 106 to display an explainer destination list as illustrated in FIG. 23C based on the explainer name, the operating state of the explainer terminal, and the skill name stored in the table of the explainer management DB 1001 (see FIG. 6A). On the screen as illustrated in FIG. 23C, the customer selects a name of a desired explainer who uses the explainer terminal from the explainer terminals in the state of ready, and presses the "OK" button. In response to such customer's operation, the reception unit 12 receives the designation of the desired explainer, and the display control unit 14 controls the display 106 to display a confirmation screen as illustrated in FIG. 23D. When the customer presses of the "OK" button on the confirmation screen, the reception unit 12 receives the pressing. In response to receiving the pressing by the reception unit 12, the data exchange unit 11 transmits a start request of a video call to the explainer terminal 9 that is designated via the communication management apparatus 5 (see the process of S90 and processes of FIG. 25 described below).

Subsequently, when the customer selects a desired skill group (for example, the support organization capable of providing consultation about a cruise) on the skill selection screen of FIG. 23A, the determination unit 15 of the store terminal 1 determines whether to transmit the start request of the video call to the explainer terminal in the state of "online (ready)" belonging to a particular skill group (for example, cruise) of the unmanned store priority support organization UG1, or to transmit the start request of the video call to the explainer terminal in the state of "online (ready)" in the same particular skill group (for example, cruise) of the manned store priority support organization MG1 (S83). In this determination process, the store terminal 1 makes the determination based on the subgroup name to which the account ID of the store terminal itself belongs in the subgroup management table (see FIG. 11B) in the service information received in step S19. When the store terminal 1 itself belongs to the unmanned store, the determination unit 15 sets a destination of the start request to the particular skill group of the unmanned store priority support organization UG1. By contrast, when the store terminal 1 itself belongs to the manned store, the determination unit 15 sets the destination of the start request to the particular skill group of the manned store priority support organization MG1.

In the following, a description is given of a case in which when the store terminal 1 is the store terminal 1c2 in FIG. 1 provided in the unmanned store US, the start request of the video call is preferentially transmitted (first transmission) to the explainer terminal 9ug11 and the explainer terminal 9ug12, each being in the state of "online (ready)", of the support organization SR21 for the skill SK1 of the unmanned store priority support organization UG1.

First, the data exchange unit 11 of the store terminal 1c2 simultaneously transmits connection request information indicating a connection request of a communication session for the video call as a first time transmission, as a previous step of a start request of the video call (see S101 in FIG. 25) (S84-1). This connection request information includes the communication ID(s) associated with the operating state "online" among the communication IDs read in step S83, the communication ID of the store terminal 1c2 that is the start request sender terminal, and the skill name indicating the skill selected in step S82.

Next, in response to receiving the connection request information transmitted by the store terminal 1c2, the data exchange unit 51 of the communication management apparatus 5 transmits the connection request information to the explainer terminal 9ug11 identified by the communication ID included in the received connection request information (step S84-2).

When the operating state is updated in step S34 (see FIG. 21) between a time when the store terminal 1c2 transmits the connection request information and a time when the store terminal 1c2 receives a response to the connection request information, the store terminal 1c2 repeats the processes of steps S82 and S83. When the operating state of the explainer terminal 9 is updated to "online" and the communication ID is extracted as the communication ID associated with the operating state "Online" as a result of the above process, The data exchange unit 11 of the store terminal 1c2 transmits the connection request information including the communication ID to the communication management apparatus 5 (step S85-1). The connection request information transmitted in step S85-1 also includes the skill name indicating the skill selected in step S82 and the communication ID of the store terminal 1c2 itself.

In response to receiving the connection request information transmitted by the store terminal 1c2, the data exchange unit 51 of the communication management apparatus 5 transmits the connection request information to the explainer terminal 9ug12 identified by the communication ID included in the received connection request information (step S85-2).

Each of the data exchange unit 91 of the explainer terminal 9ug11 and the data exchange unit 91 of the explainer terminal 9ug12 receives the connection request information transmitted from the store terminal 1c2 via the communication management apparatus 5. In response to receiving the connection request information, the display control unit 94 of the explainer terminal 9ug11 and the display control unit 94 of the explainer terminal 9ug12 respectively controls the display 106 of the explainer terminal 9ug11 and the display 106 of the explainer terminal 9ug12 to display a message including information on the request sender terminal corresponding to the communication ID included in the connection request information and the skill name (skill information) corresponding to the skill name included in the call start request. Since the message includes the skill, the explainer of each explainer terminal 9ug11 and the explainer terminal 9ug12 recognizes in advance what travel product the customer desires.

Next, when each of the explainer ug11 using the explainer terminal 9ug11 and the explainer ug12 using the explainer terminal 9ug12 performs an input operation of permitting a response, each of the reception unit 92 of the explainer terminal 9ug11 and the reception unit 92 of the explainer terminal 9ug12 receives the input operation of permitting the response (steps S86-1 and S86-2). In response to receiving the input operation of permitting the response, each of the data exchange unit 91 of the explainer terminal 9ug11 and the data exchange unit 91 of the explainer terminal 9ug12 transmits response information indicating that connection is permitted to the communication management apparatus 5 (steps S87-1 and S87-2). This response information includes the communication ID of the transmission source (the store terminal 1c2) and the communication ID of the explainer terminal itself (9ug11, 9ug12). Thus, the data exchange unit 51 of the communication management apparatus 5 receives the response information transmitted by each of the explainer terminal 9ug11 and the explainer terminal 9ug12. Note that the above process is just an example. In another example, in response to receiving the connection request information from the store terminal 1c2, each of the data exchange unit 91 of the explainer terminal 9ug11 and the data exchange unit 91 of the explainer terminal 9ug12 automatically transmits the response information to the connection request to the store terminal 1c2. In still another example, in a case in which each of the data exchange unit 91 of the explainer terminal 9ug11 and the data exchange unit 91 of the explainer terminal 9ug12 receives a plurality of pieces of connection request information from a plurality of store terminals 1, the data exchange unit 91 transmits the response information to the store terminal 1 from which the connection request information is received first.

Next, the data exchange unit 51 of the communication management apparatus 5 transmits the received response information to the store terminal 1c2 identified by the communication ID included in this response information (steps S87-2, S88-2).

In a case in which the data exchange unit 11 of the store terminal 1c2 receives a plurality of pieces of response information, the determination unit 15 identifies the explainer terminal 9 that transmits the response information earliest (S89). In the present embodiment, a description is given hereinafter of an example case in which the explainer terminal 9ug11 first transmits the response information.

The data exchange unit 51 of the communication management apparatus 5 controls establishment of a communication session for performing a video call between the explainer terminal 9ug11 and the store terminal 1, which are respectively identified by the "communication ID of the store terminal" and the "communication ID of the explainer" included in the communication establishment request. Through the established session, content data such as image data or audio data is exchanged between the explainer terminal 9ug11 and the store terminal 1 via the relay apparatus 3 (step S90). A detailed description is given of the step S90 below with reference to FIG. 25. The session described above is an example and not limiting. In another example, in the session, the content data is directly exchanged between the explainer terminal 9ug11 and the store terminal 1c2 through the communication network 100. Once the communication is established between the store terminal 1c2 and the explainer terminal 9ug11, one of the store terminal 1c2 and the explainer terminal 9ug11 transmits image data of an image captured by the own terminal and audio data of sound collected by the own terminal to the other one of the store terminal 1c2 and the explainer terminal 9ug11 via the relay apparatus 3. Thus, video call can be started between the customer and the explainer, as illustrated in FIG. 2.

When the communication is established in step S90, the data exchange unit 91 of the explainer terminal 9ug11 transmits the state information including the operating state "Chat", the skill name "specialty 1", and the communication ID of the explainer terminal 9ug11 to the communication management apparatus 5.

Further, when the communication is established in step S90, the data exchange unit 11 of the store terminal 1c2 transmits cancellation information to the communication management apparatus 5, to cancel the call start requests from the explainer terminals 9 that transmit the response information, except for the explainer terminal 9 from which the store terminal 1c2 receives the response information first. (S91-1). The cancellation information includes the communication ID of the store terminal 1c2 itself and the communication ID of the explainer terminal 9 (in this example, the explainer terminal 9ug12) that transmit the response information, except for the explainer terminal from which the store terminal 1c2 receives the response information first.

Figure 25:
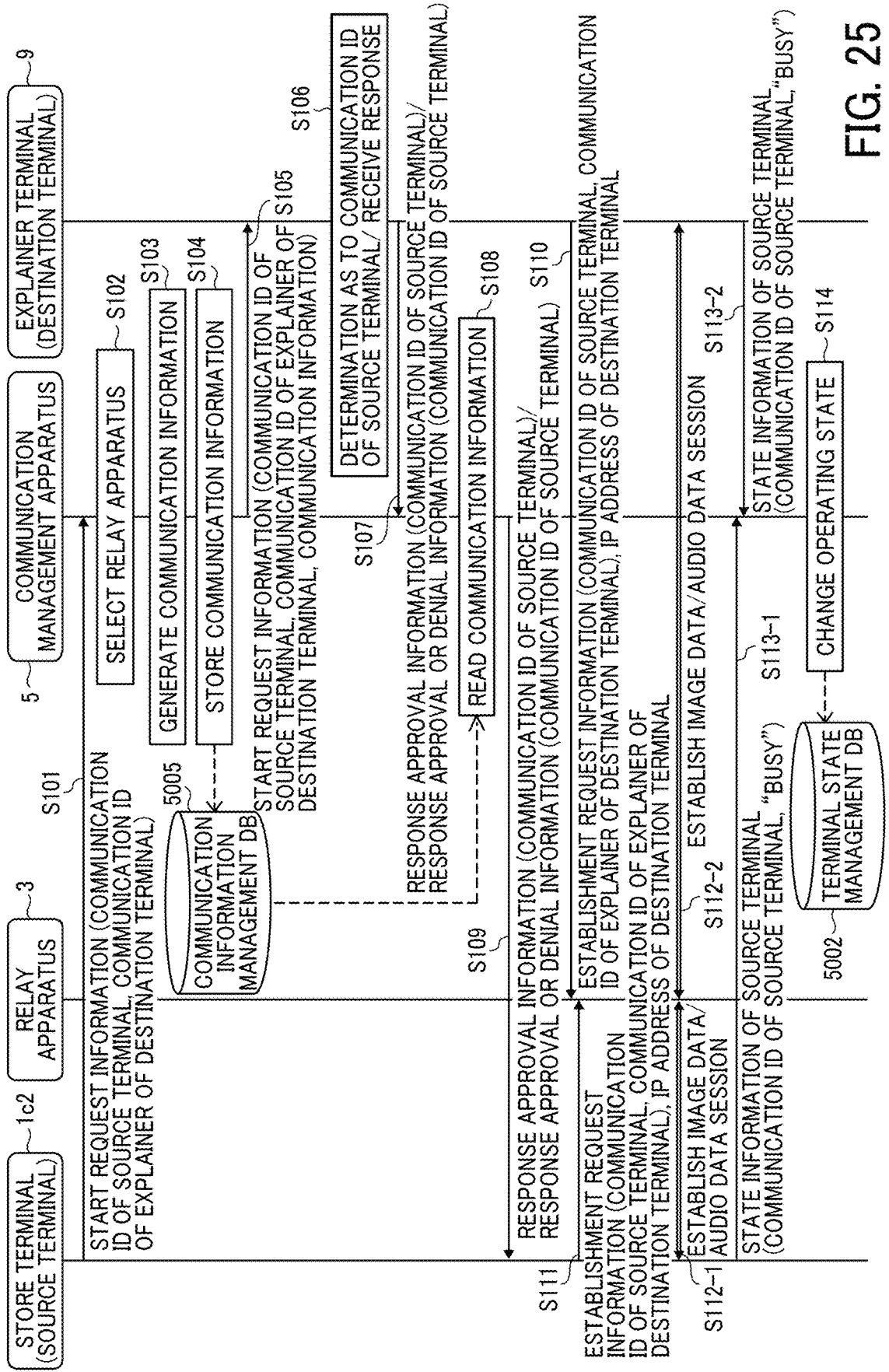
FIG. 25 is a sequence diagram illustrating detailed processes of controlling establishment of the session, according to an embodiment of the present disclosure.

In response to receiving the cancellation information, the data exchange unit 51 of the communication management apparatus 5 transmits the cancellation information to the explainer terminal 9ug12 identified by the communication ID included in the cancellation information (step S91-2). The data exchange unit 11 of the explainer terminal 9ug12 receives the cancellation information transmitted by the communication management apparatus 5. This allows the explainer terminal 9ug12 to be informed that the response is not necessary any more to the call start request from the store terminal 1. Processes of Establishing Communication:

A detailed description is now given of processes of controlling establishment of the session performed in S90 of FIG. 24, with reference to FIG. 25. FIG. 25 is a sequence diagram illustrating detailed processes of controlling establishment of the session.

First, the store terminal 1c2 transmits start request information indicating a request for start a video call to the communication management apparatus 5 (step S101). The start request information includes the communication ID of the source terminal (in this example, the store terminal 1c2) and the communication ID of the explainer ug11 of the destination terminal (in this example, the explainer terminal 9ug11). Thereby, the communication management apparatus 5 receives the start request information.

Next, the selection unit 53 of the communication management apparatus 5 selects the nearest relay apparatus based on the IP addresses of the source terminal and the destination terminal (step S102). The IP address of each terminal is stored in the terminal management table, and the IP address of each relay apparatus is stored in the storage unit 5000 in advance. Next, the creation unit 54 creates communication information including the IP address of the relay apparatus 3 and the communication IDs described above (step S103). Next, the storing/reading processing unit 59 stores, in the communication information management DB 5005 (see FIG. 8C), the communication IDs and the IP address of the relay apparatus 3, which is contents of the communication information, and the communication IDs of the source terminal and the explainer of the destination terminal received in step S101, in association with each other. After that, the data exchange unit 51 transmits start request information to the destination terminal (in this example, the explainer terminal 9ug11) (step S105). The start request information includes the communication information in addition to the communication IDs transmitted from the source terminal in step S101. Thereby, the data exchange unit 91 of the destination terminal receives the start request information.

Next, the determination unit 95 of the explainer terminal 9ug11 as the destination terminal determines whether the communication ID of the source terminal (the store terminal 1c2) received in S105 is the same communication ID of the store terminal 1c2, which has already been received in the process of step S84-2 in FIG. 24 (S106). In this case, since the communication IDs are the same with each other, the data exchange unit 91 transmits response approval information to the communication management apparatus 5 (step S107). The response approval information in this case indicates that a response is available and includes the communication ID of the source terminal. Thereby, the data exchange unit 51 of the communication management apparatus 5 receives the response approval information.

Next, the storing/reading processing unit 59 of the communication management apparatus 5 searches the communication information management DB 5005 using the communication ID of the source terminal received in step S107 as a search key, to read the associated communication information (the communication ID, the IP address of the relay apparatus 3) (step S108). Next, the data exchange unit 51 transmits the response approval information to the source terminal. This response approval information includes the communication information read in step S108. Thereby, the data exchange unit 11 of the source terminal receives the response approval information.

Next, the data exchange unit 91 of the destination terminal transmits establishment request information indicating a request for establishing a mutual communication session to the IP address of the relay apparatus 3 included in the communication information received in step S105 (step S110). This establishment request information includes the communication ID of the source terminal and the communication ID of the explainer of the destination terminal. The establishment request information further includes the IP address of the destination terminal, which is a sender terminal of the establishment request information. On the other hand, the data exchange unit 11 of the source terminal transmits establishment request information indicating a request for establishing a mutual communication session to the IP address of the relay apparatus 3 included in the communication information received in step S109 (step S111). This establishment request information includes the communication ID of the source terminal and the communication ID of the explainer of the destination terminal. The establishment request information further includes the IP address of the source terminal, which is a sender terminal of the establishment request information. Thus, a communication session for mutual communication of images and sounds is established between the relay apparatus 3 and the source terminal (step S112-1). Further, a communication session for mutual communication of images and sounds is established between the relay apparatus 3 and the destination terminal (step S112-2).

Next, the data exchange unit 11 of the source terminal transmits state information of the source terminal itself to the communication management apparatus 5 (step S113-1). The state information includes the communication ID of the source terminal and the operating statue information (in this example, "busy"). Thereby, the data exchange unit 51 of the communication management apparatus 5 receives the state information of the source terminal. On the other hand, the data exchange unit 91 of the destination terminal transmits state information of the destination terminal itself to the communication management apparatus 5 (step S113-2). The state information includes the communication ID of the destination terminal and the operating statue information (in this example, "chat (busy)"). Thereby, the data exchange unit 51 of the communication management apparatus 5 receives the state information of the destination terminal. As described, each terminal transmits a notification indicating the operating state of the own terminal to the communication management apparatus 5. The storing/reading processing unit 59 of the communication management apparatus 5 changes the operating state associated with the communication ID of the source terminal to "Chat (busy)" in the terminal management table (see FIG. 10), and changes the operating state associated with the communication ID of the destination terminal to "Chat (busy)" (step S114). Thus, the source terminal (store terminal 1c2) and the destination terminal (explainer terminal 9ug11) performs a video call by mutual communication, as illustrated in FIG. 2. The description given heretofore is of the processes performed when the skill group such as "cruise" is selected on the screen as illustrated FIG. 23A in step S82.

Start Request of Video Call when Particular Explainer is Designated:

A description is now given of processes of starting video call when a particular explainer is designated on the screen as illustrated in FIG. 23C in step S82. In this case, only the process of step S90 in FIG. 24 is performed among the processes of step S84 and subsequent steps.

Further, since the processes of steps S84-2 and S85-2 of FIG. 24 are not performed when a particular explainer is designated, in step S106 of FIG. 25, the display control unit 94 displays the communication ID of the source terminal, so that the designated explainer manually selects whether or not to respond. When the designated explainer selects whether to respond, the reception unit 92 receives the selection of whether to respond.

In steps S107 and S109, response approval or denial information is transmitted instead of the response approval information. The response approval or denial information also includes the communication ID of the source terminal. Other processes are performed in the same or substantially the same manner as when the skill group is selected, and therefore the redundant descriptions thereof are omitted below.

Figure 26:
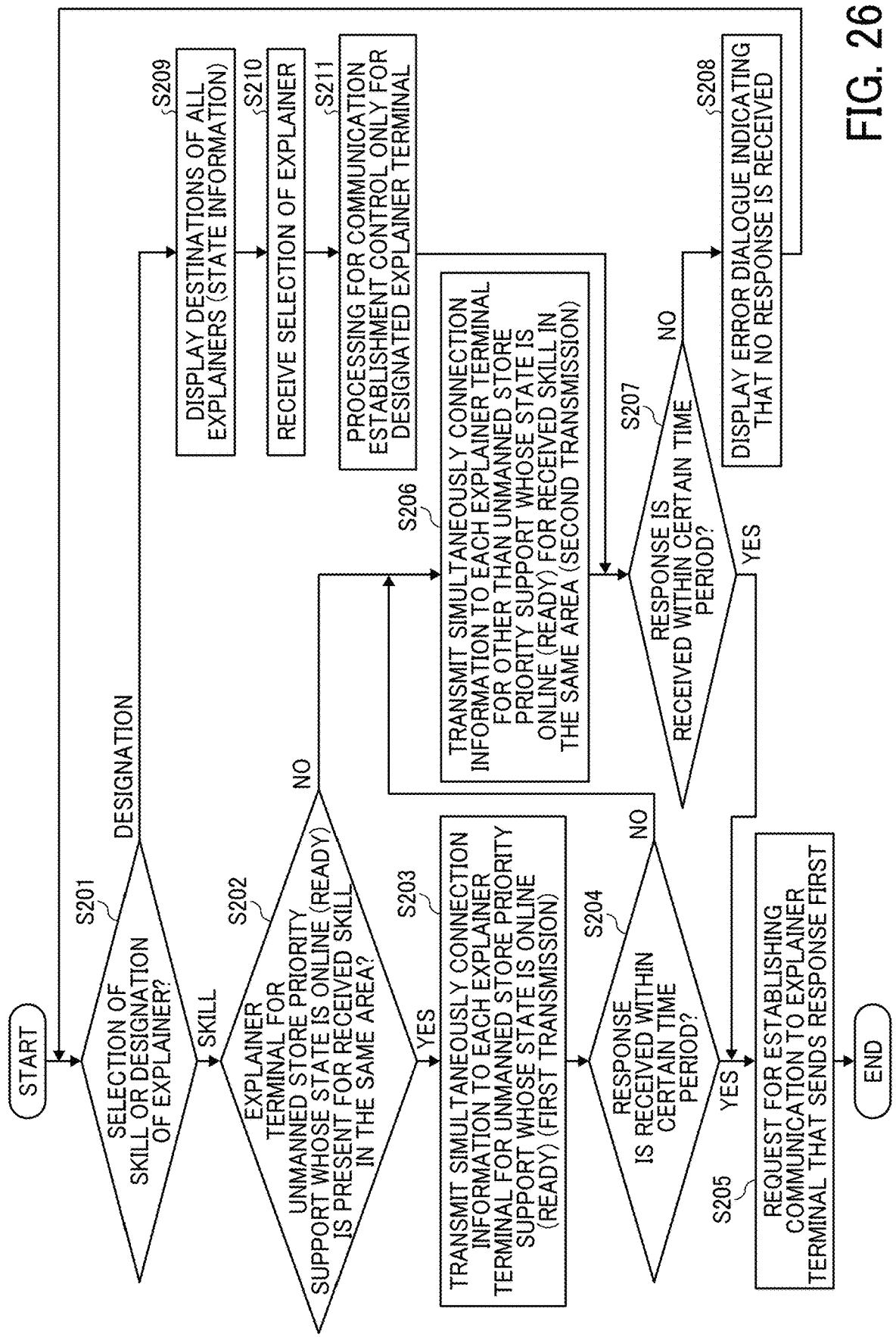
FIG. 26 is a flowchart illustrating various types of processes of starting a call, according to an embodiment of the present disclosure.

Processes of Changing Destination to which Start Request of Video Call is to be Transmitted:

A description is now given of processes changing a destination to which the start request of the video call is to be transmitted, the processes being performed when no explainer terminal responds to the start request in steps S86-1 and S86-2 of FIG. 24, with reference to FIG. 26. FIG. 26 is a flowchart illustrating various types of processes of starting a call. Specifically, FIG. 26 is a flowchart illustrating three patterns of the start request after selecting a desired skill group, a change of the transmission destination to which the start request is to be transmitted, and the start request when a desired explainer is designated.

Note that determinations by the determination unit 15 described below are performed based on each information managed in the explainer management DB 1001 and the skill group management DB 1002 stored in the storage unit 1000.

First, the store terminal 1c2 in the unmanned store US, the determination unit 15 determines whether a desired skill group is selected, or a desired explainer is designated in step S82 of FIG. 24 (S201). When the desired skill group is selected (S201: skill), the determination unit 15 determines whether any explainer terminal whose operating state is "online (ready)" belonging to the unmanned store priority support organization is present for the selected skill group in the same area E1 (S202). When one or more explainer terminals whose operating states are "online (ready)" belonging to the unmanned store priority support organization are present (S202; YES), the data exchange unit 11 of the store terminal 1c2 simultaneously transmits as the first time, to the one or more explainer terminals whose operating states are "online (ready)" belonging to the unmanned store priority support organization, connection request information indicating a connection request of a communication session for the video call, as a previous step of the start request of the video call (see S101 of FIG. 25) (S203). The process of step S203 corresponds to the processes of steps S84-1 and S85-1 in FIG. 24.

After the processes of steps S84-1 and S85-1, the determination unit 15 determines whether the store terminal 1c2 receives the response information from each of the explainer terminal 9ug11 and the explainer terminal 9ug12 within a certain time period (e.g., 30 seconds) (S87-2 and S88-2) (S204). When the response information is received within the certain time period (S204; YES), the store terminal 1c2 performs control of establishing communication with the explainer terminal (in this example, the explainer terminal 9ug11) that responds first (S205). The process of step S205 corresponds to the processes of steps S89 and S90 in FIG. 24. In this case, the operation of FIG. 26 ends.

By contrast, when the response information indicating connection is unavailable is received (S202: NO), or when the response information indicating whether or not the connection is available is not received within the certain time period (e.g., 30 seconds) after the connection request information is transmitted in (S204: NO), The data exchange unit 11 of the store terminal 1c2 changes the destination to the explainer terminal 9mg11 and the 9mg12 whose operating states are "online (ready)" belonging to the manned store priority support organization, to transmit the connection request information as the second time to the changed destination (S206). After the processes of steps S84-1 and S85-1 as the second time, the determination unit 15 determines whether the store terminal 1c2 receives the response information (S87-2, S88-2) from each of the explainer terminal 9mg11 and the explainer terminal 9mg12 within a certain time period (S207). When the response information is received within the certain time period (S207: YES), the store terminal 1c2 performs control of establishing communication with the explainer terminal (in this example, the explainer terminal 9mg11) that responds in step S205. By contrast, when no response information is received within the certain time period (S207: NO), the display control unit 14 controls the display 106 of the store terminal 1c2 itself to display an error dialog box indicating that no response is received (S208). Then, the operation returns to step S201.

On the other hand, when a desired explainer is designated in S201 (S201: designation), the display control unit 14 controls the display 106 of the store terminal 1c2 itself to display the destination list of the explainer as illustrated in FIG. 23C (S209). The reception unit 12 receives the designation (selection) of the explainer from the customer c2 (S210). The processes of steps S209 and S210 corresponds to the processes of step S82 in FIG. 24.

Accordingly, the store terminal 1c2 performs control of establishing communication only with the designated explainer terminal (in this example, the explainer terminal 9ug11) (S211). The process of step S211 corresponds to the process of step S90 in FIG. 24.

In recent years, since the number of unmanned stores is increasing, even when a customer sends a call start request from a customer terminal in an unmanned store to explainer terminals that are configured to preferentially support unmanned stores at a service center, there may be a case where all explainers who have skills to handle the customer request are not be able to respond, because all the explainers are already responding to other customers remotely, for example. Therefore, there is still a drawback that the loss of customers may occur.

As described heretofore, according to the present embodiment, even when the call start request (first time) from the store terminal US of the unmanned store is transmitted to each of the explainer terminal 9ug11 and the explainer terminal 9ug12 belonging to the support organization SR21 for the desired skill SK1 of the unmanned store priority support organization UG1 and no response is received from any explainer terminal, the call start request (second time) is transmitted to each of the explainer terminal 9mg11 and the explainer terminal 9mg12 of the support organization SR11 for the same skill SK1 of the manned store priority support organization MG1. Thus, while taking advantage of unmanned stores such as streamlining store operations and increasing efficiency, since the explainer terminal 9ug11 and the explainer terminal 9ug12 are provided that preferentially support customers visiting the unmanned store, thereby reducing the number of customers leaving the unmanned store. Further, even in a case in which the explainer terminal 9ug11 and the explainer terminal 9ug12 that preferentially support customers visiting the unmanned store are not available to make a response, the store terminal can make a call start request to the explainer terminal 9mg11 and the explainer terminal 9mg12 that preferentially support customers in the manned store, thereby further reducing the loss of customers.

According to one or more embodiments of the present disclosure, the loss of customers is reduced.

The store terminal 1 is an example of a communication terminal. The PC is just one example of the store terminal 1. Other examples of the store terminal 1 includes, but are not limited to, a smartwatch, a game machine, a video call dedicated device.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A communication terminal communicable with a plurality of explainer terminals, each used by an explainer capable of explaining to a customer in a store via a communication network, the communication terminal comprising:
    circuitry configured to
        receive selection of a skill group;
        perform first transmission of connection request information indicating a connection request to a first explainer terminal, which is part of a preferred group of terminals for the selected skill group that preferentially responds to the connection request from the communication terminal provided in an unmanned store, the connection request information including a communication ID identifying the first explainer terminal and skill name indicating the selected skill group; and
        receive response information indicating a response of connection availability from the first explainer terminal, wherein
    the circuitry is further configured to perform second transmission of the connection request information simultaneously to a plurality of second explainer terminals for the selected skill group, which are not part of the preferred group of terminals for the selected skill group that preferentially responds to the connection request from the communication terminal provided in the unmanned store, (1) when the circuitry receives, from the first explainer terminal, the response information indicating that connection is unavailable, or (2) when the circuitry receives, from the first explainer terminal, no response information indicating whether the connection is available within a certain time period after the first transmission of the connection request information.

2. The communication terminal of claim 1, wherein the circuitry is further configured to communicate with the first explainer terminal and the second explainer terminal, each of which is used by a corresponding explainer that has a same skill relating to explanation.

3. The communication terminal of claim 1, wherein the circuitry is further configured to transmit a skill name with the connection request information.

4. A communication terminal communicable with a plurality of explainer terminals respectively used by a plurality of explainers, each explainer capable of explaining to a customer in a store via a communication network, the communication terminal comprising:
    circuitry configured to
        receive selection of a skill group;
        perform first transmission of connection request information indicating a connection request to each of a plurality of first explainer terminals, which is a preferred group of terminals for the selected skill group that preferentially responds to the connection request from the communication terminal provided in an unmanned store, the connection request information including communication IDs identifying the plurality of first explainer terminals respectively and skill name indicating the selected skill group; and
        receive response information indicating a response of connection availability from each of the plurality of first explainer terminals, wherein
    the circuitry is further configured to perform second transmission of the connection request information simultaneously to each of a plurality of second explainer terminals for the selected skill group, which is not part of the preferred group of terminals for the selected skill group that preferentially responds to the connection request from the communication terminal provided in the unmanned store, (1) when the circuitry receives, from each of the plurality of first explainer terminals, the response information indicating that connection is unavailable, or (2) when the circuitry receives, from each of the plurality of first explainer terminals, no response information indicating whether the connection is available within a certain time period after the first transmission of the connection request information.

5. The communication terminal of claim 4, wherein
the circuitry is further configured to perform the first transmission of the connection request information simultaneously to the plurality of first explainer terminals.

6. The communication terminal of claim 5, wherein
the circuitry is further configured to perform the first transmission of the connection request information to a particular first explainer terminal, of the plurality of first explainer terminals, that is ready for a call, among the plurality of first explainer terminals.

7. The communication terminal of claim 4, wherein the circuitry is further configured to perform the second transmission of the connection request information to a particular second explainer terminal, of the plurality of second explainer terminals, that is ready for a call, among the plurality of second explainer terminals.

8. A communication system comprising:
the communication terminal of claim 4;
the plurality of first explainer terminals; and
the plurality of second explainer terminals.

9. The communication terminal of claim 4, wherein
the circuitry is further configured to receive designation of a particular explainer among a plurality of first explainers respectively using the plurality of first explainer terminals and a plurality of second explainers respectively using the plurality of second explainer terminals, and
when the circuitry receives the designation of the particular explainer, the circuitry is further configured to perform the first transmission of the connection request information to a particular explainer terminal used by the designated particular explainer, and
when the circuitry does not receive the designation of the particular explainer, the circuitry is further configured to perform the first transmission of the connection request information to the plurality of first explainer terminals.

10. The communication terminal of claim 4, wherein the circuitry is further configured to transmit a skill name with the connection request information.

11. The communication system of claim 8, wherein
each of a plurality of first explainers respectively using the plurality of first explainer terminals and each of a plurality of second explainers respectively using the plurality of second explainer terminals has a same skill relating to explanation.

12. The communication system of claim 8, wherein each of the plurality of second explainer terminals is in a manned store.

13. A communication method performed by a communication terminal communicable with an explainer terminal used by an explainer capable of explaining to a customer in a store via a communication network, the method comprising:
receiving selection of a skill group;
performing first transmission of connection request information indicating a connection request to a first explainer terminal, which is a part of a preferred group of terminals for the selected skill group that preferentially responds to the connection request from the communication terminal provided in a store, the connection request information including a communication ID identifying the first explainer terminal and skill name indicating the selected skill group; and
receiving response information indicating a response of connection availability from the first explainer terminal,
wherein the method further includes performing second transmission of the connection request information simultaneously to a plurality of second explainer terminals for the selected skill group, which are not part of the preferred group of terminals for the selected skill group that preferentially responds to the connection request from the communication terminal provided in the store, (1) when receiving, from the first explainer terminal, the response information indicating that connection is unavailable, or (2) when the receiving, from the first explainer terminal, no response information indicating whether the connection is available within a certain time period after the first transmission of the connection request information.

14. The communication method of claim 13, further comprising determining whether the preferred group corresponds to a manned store or an unmanned store.

15. The communication method of claim 13, wherein the performing step comprises transmitting a skill name with the connection request information.

16. A non-transitory computer-readable medium storing a program storing instructions which, when executed by a computer, causes the computer to execute the method of claim 13.

* * * * *